| D REG BIT POSITION | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|
| RESULT BIT WEIGHT IN D REG | 27 | 26 | 25 | 24 | 23 | 22 | 21 | 20 | 19 | 12 | 17 | 16 | 15 | 14 | 13 |

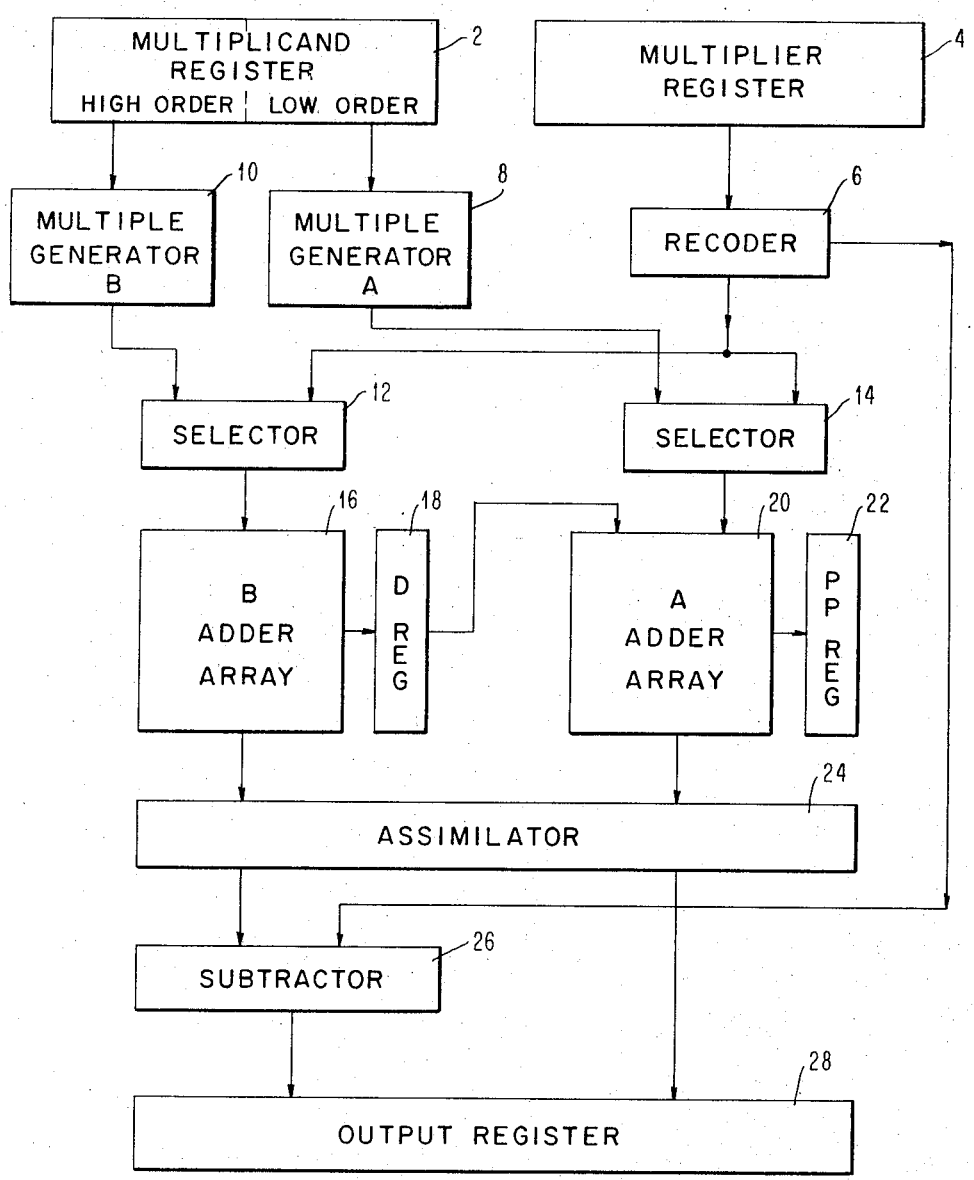

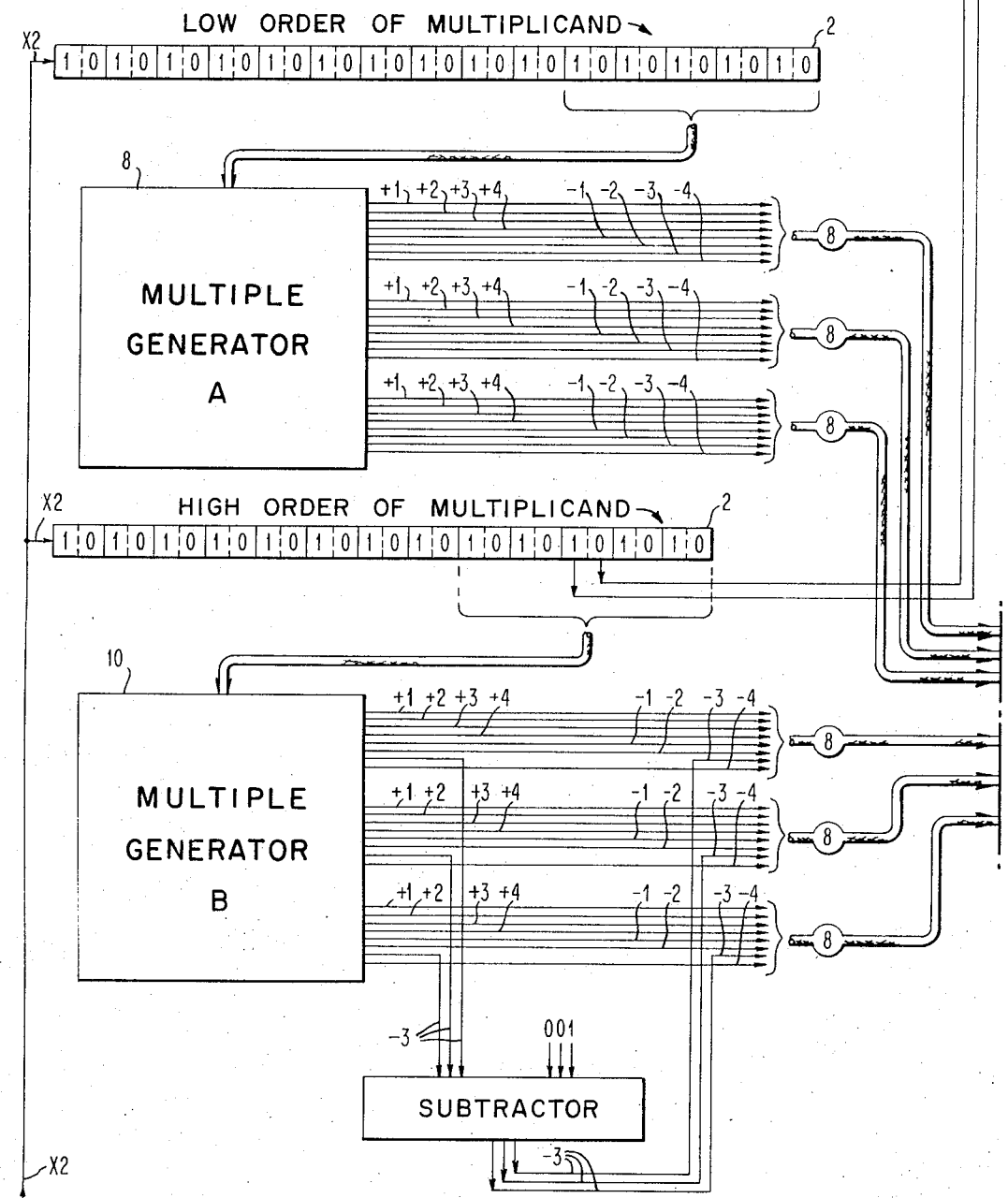

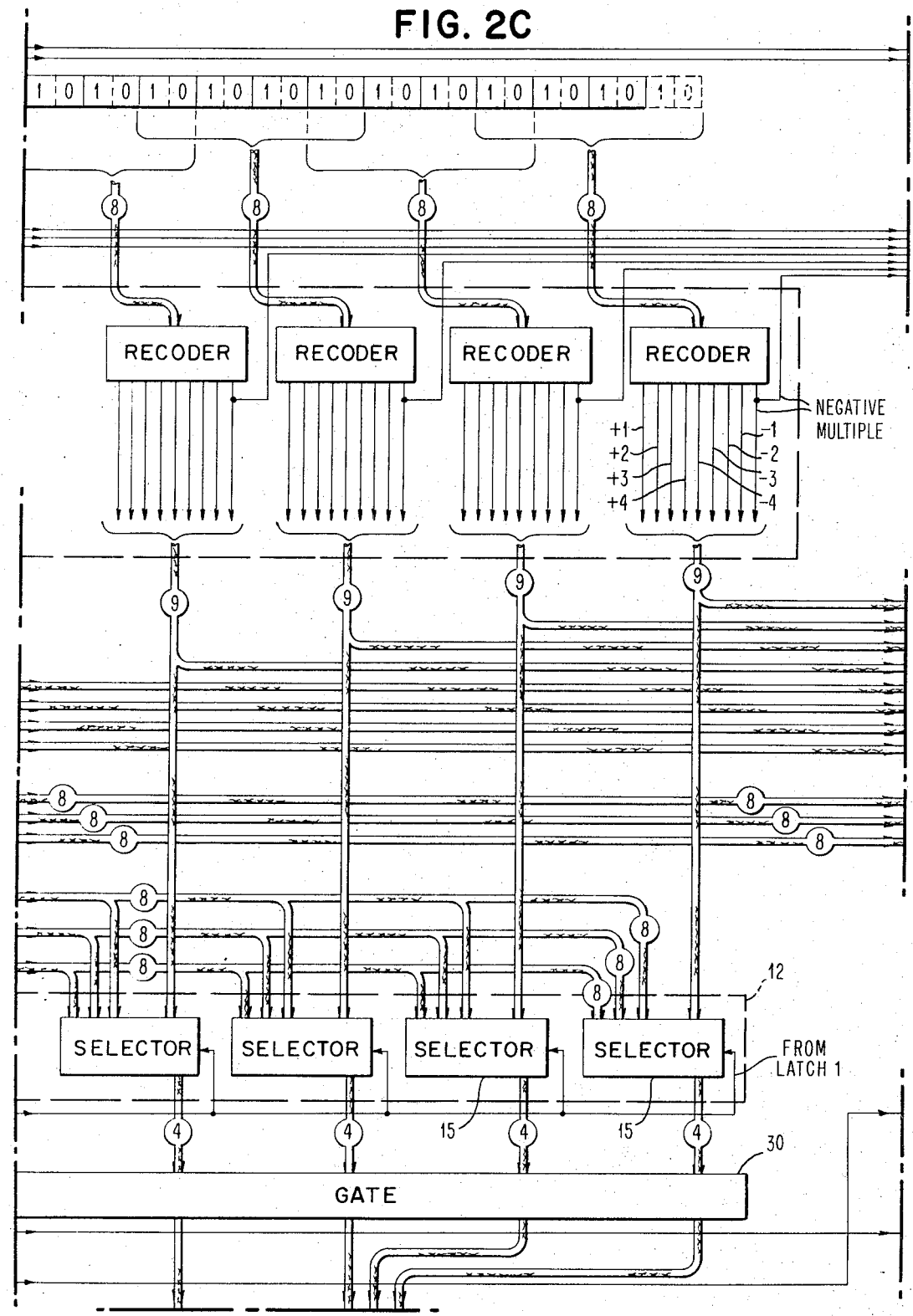

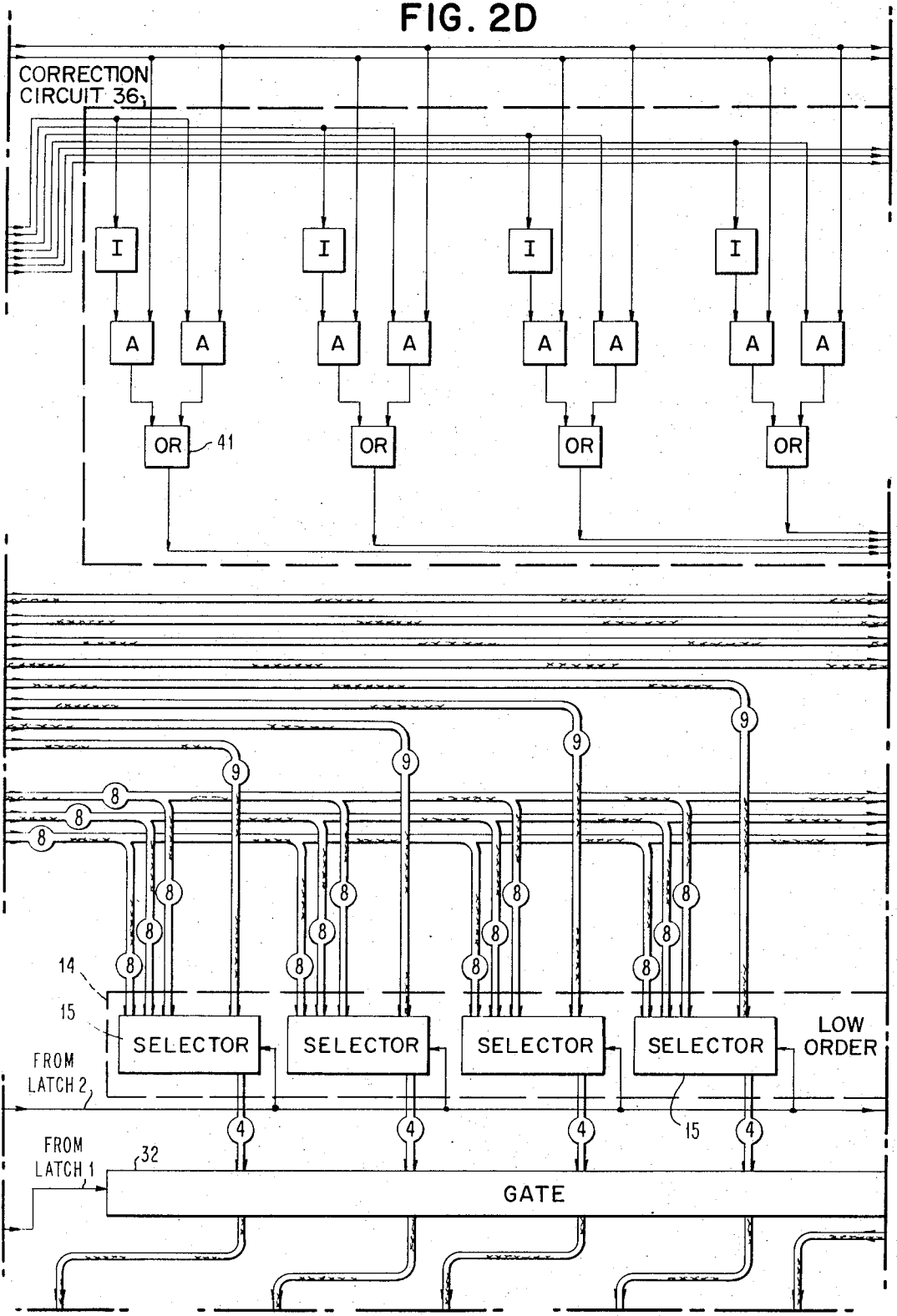

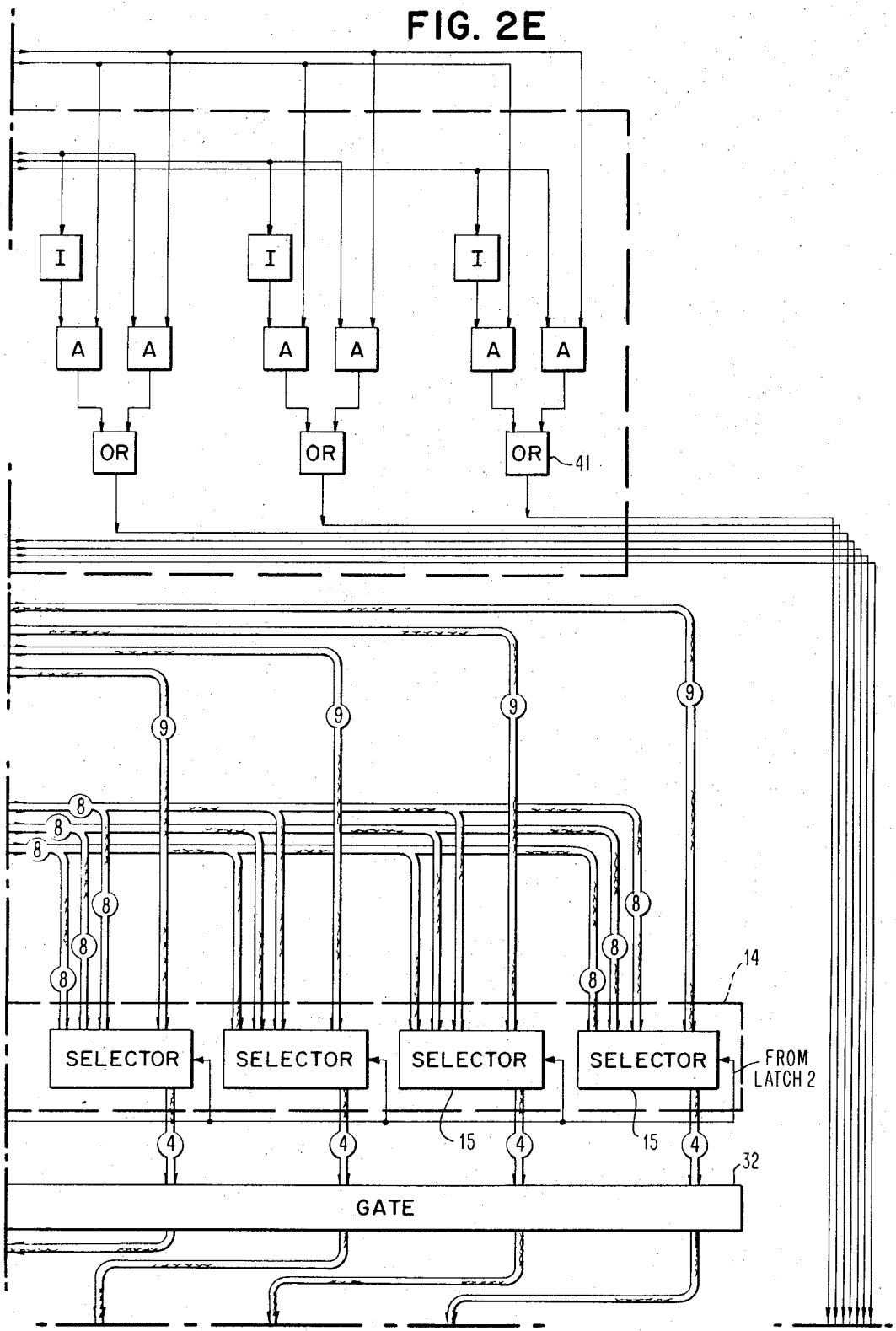

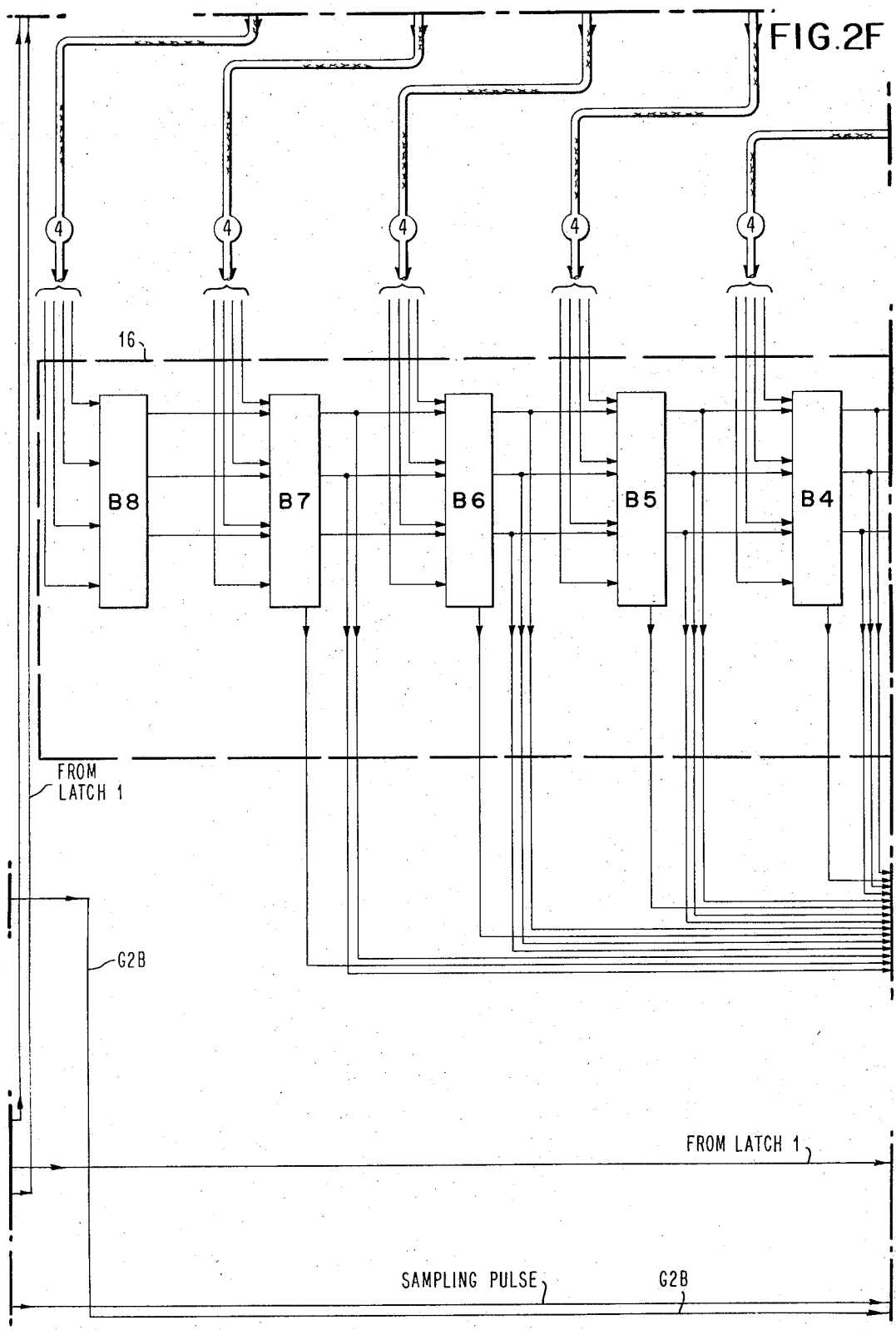

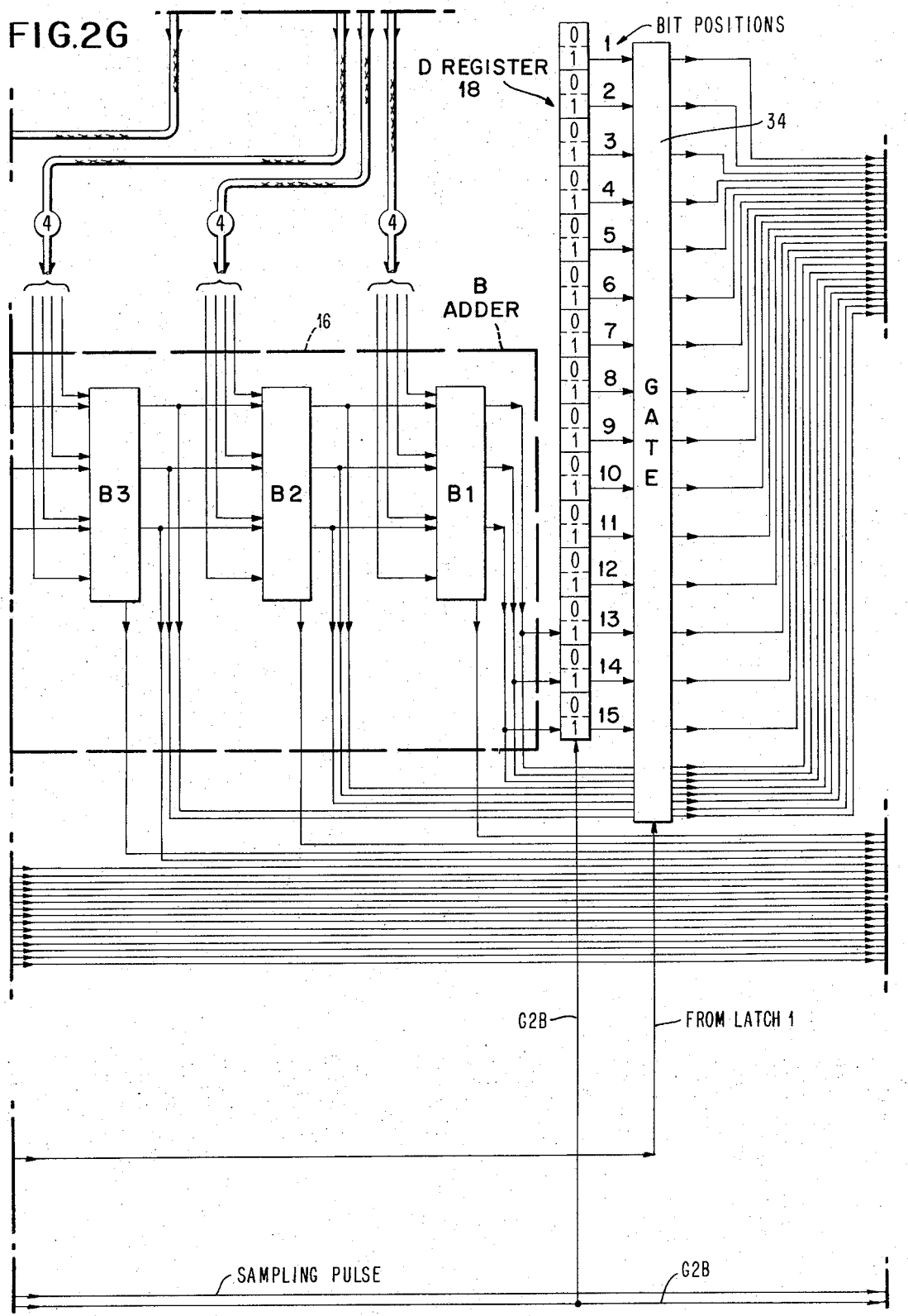

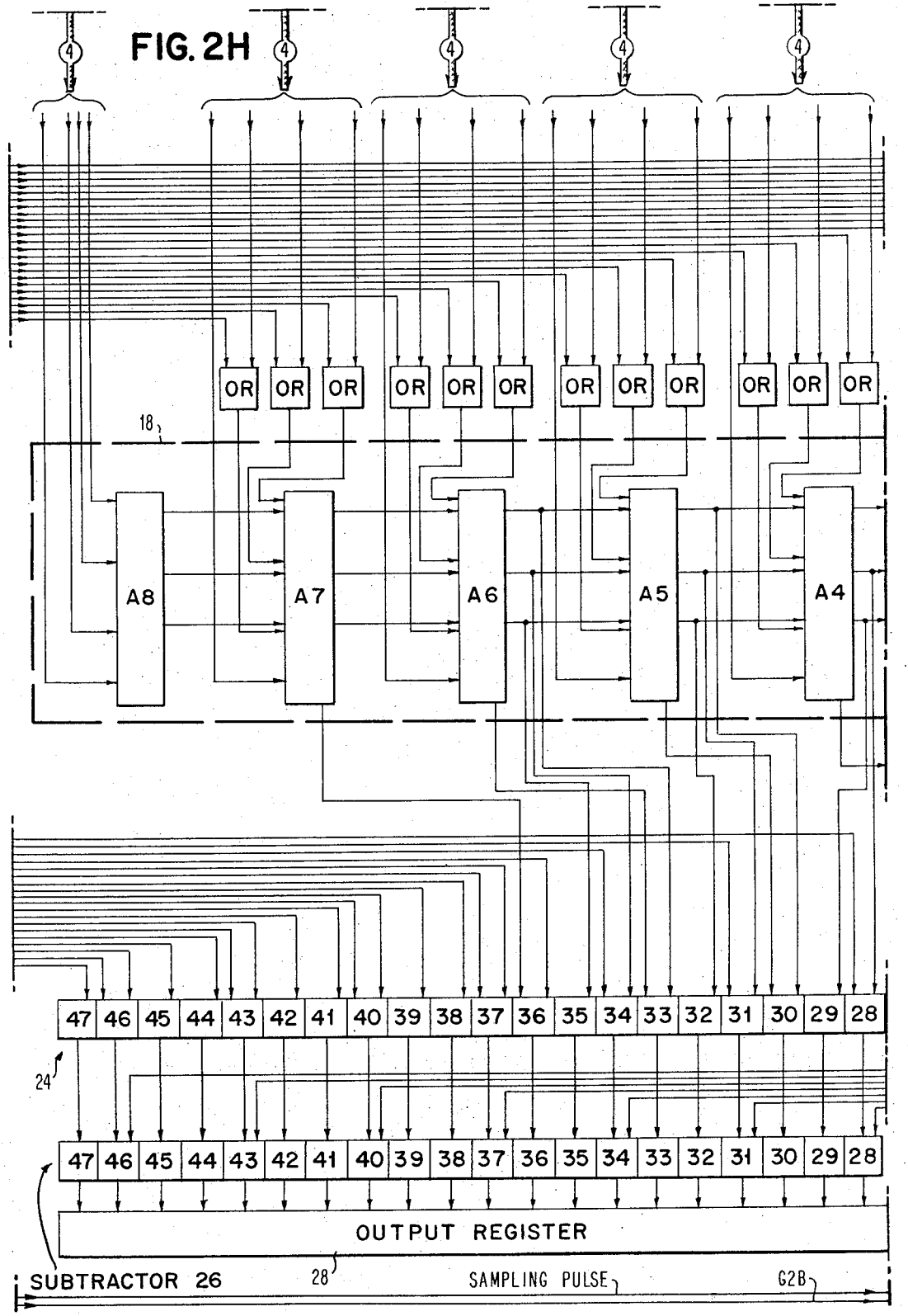

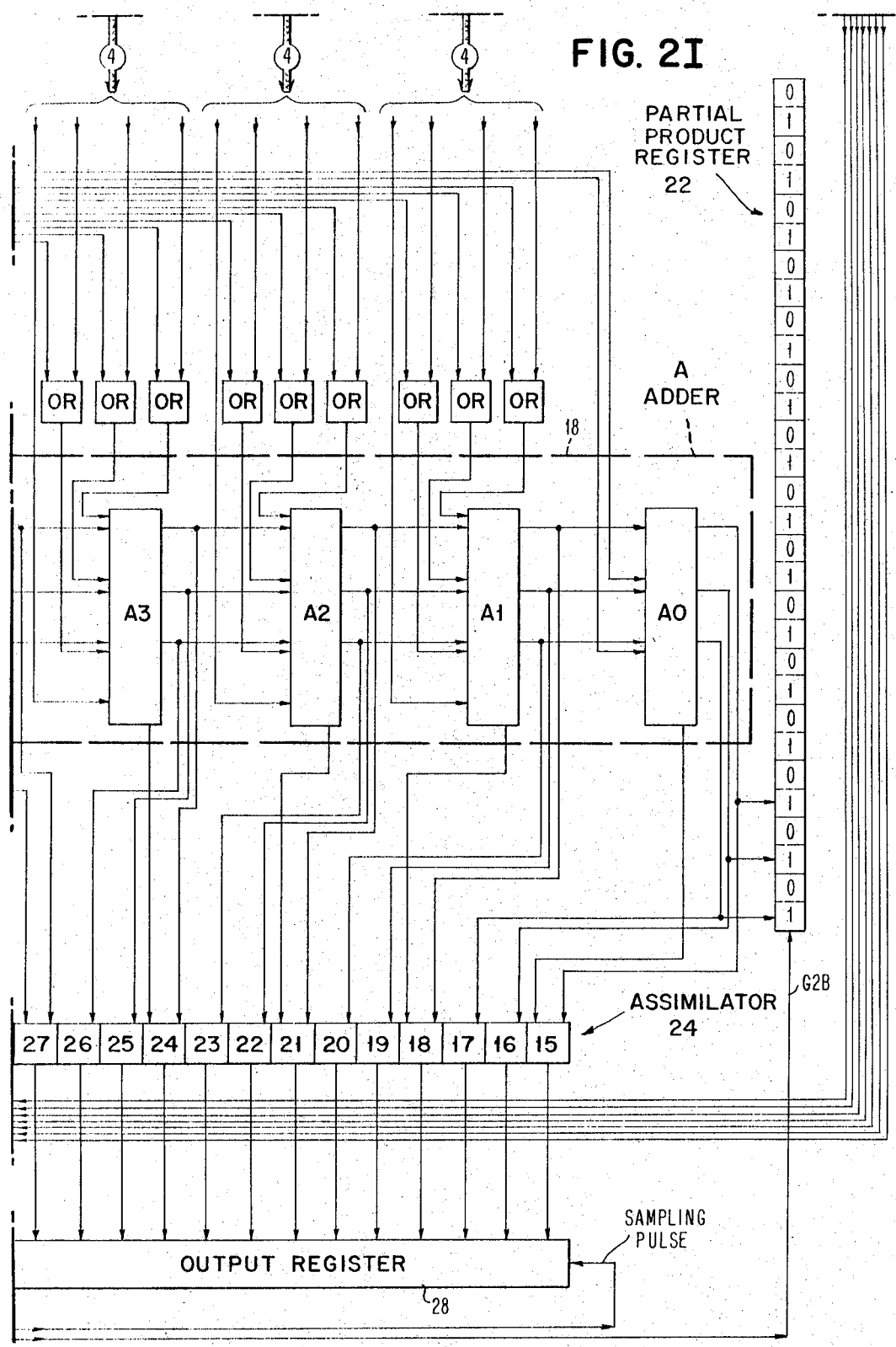

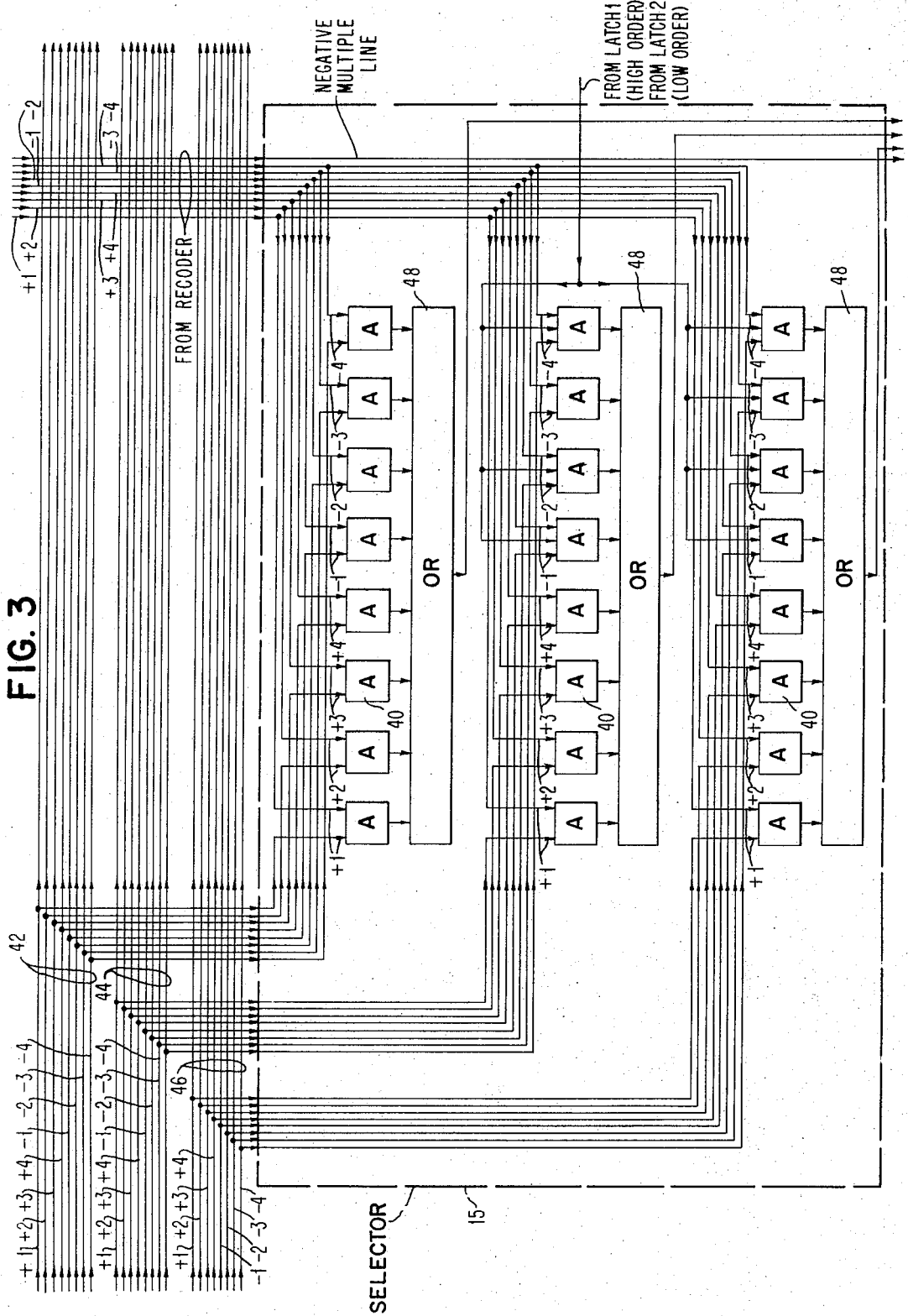

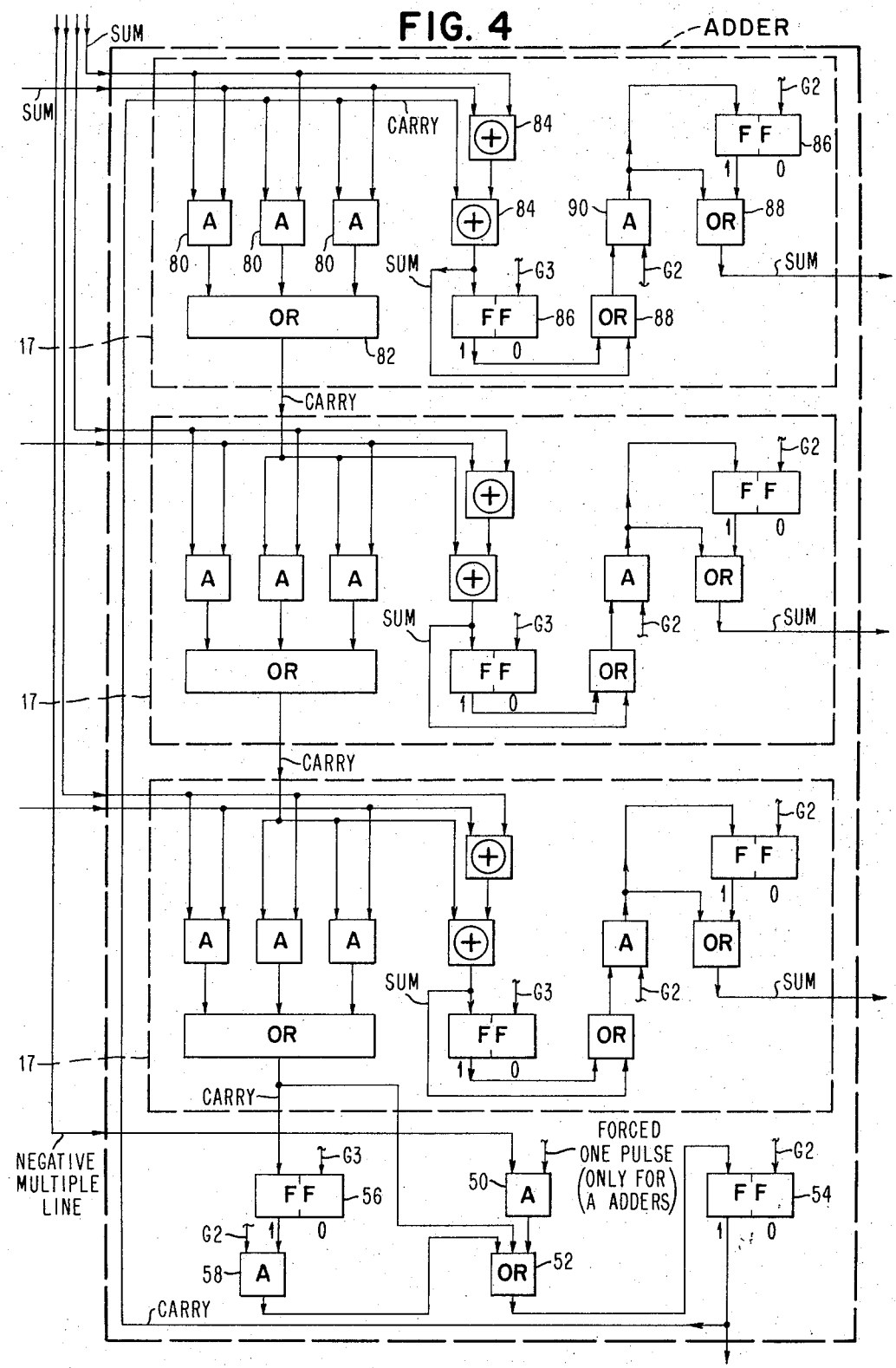

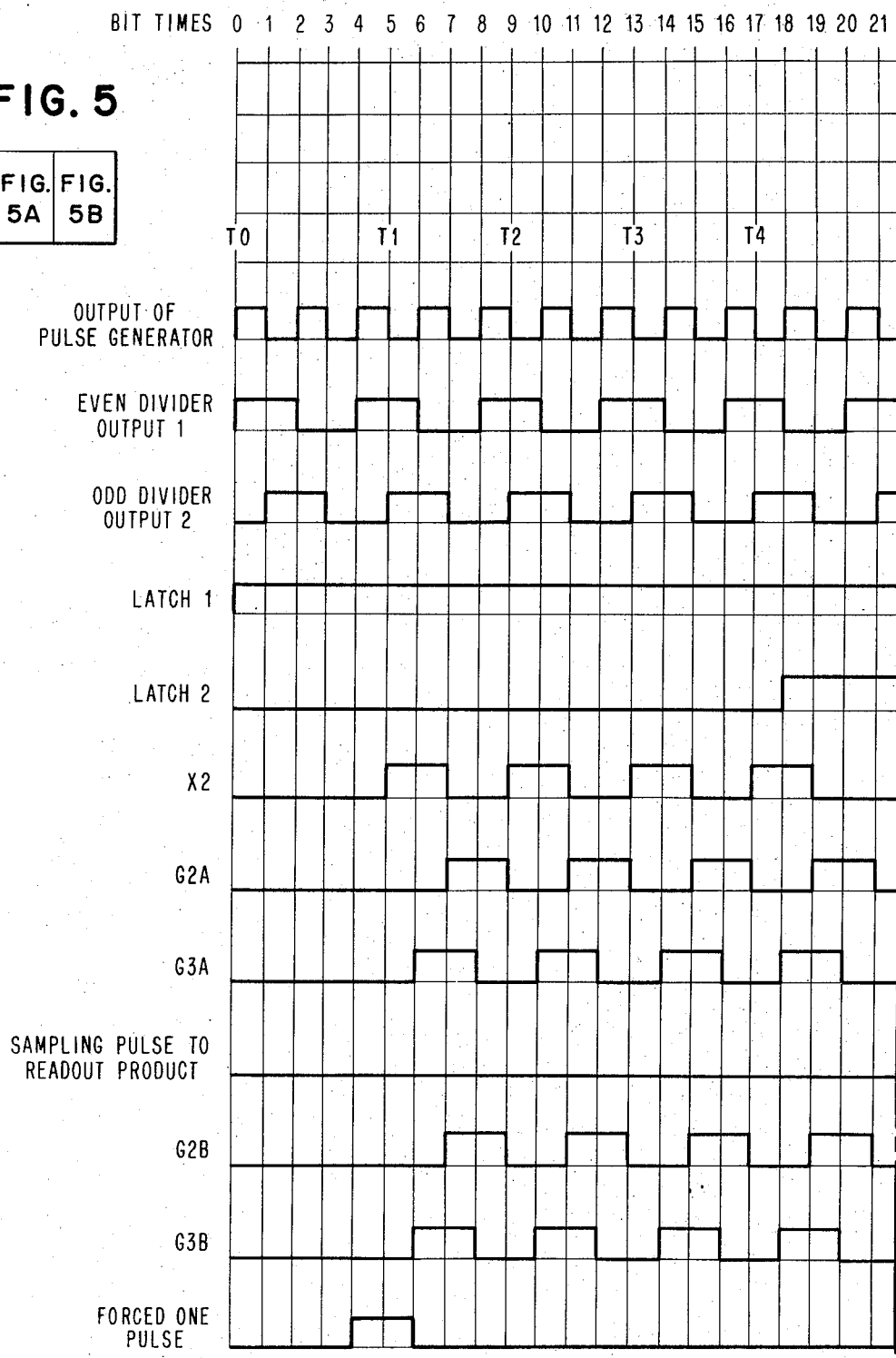

| D REGISTER BIT POSITION | A ADDER POSITION |
|---|---|
| D1 | A0-2 |
| D2 | A0-3 |
| D3 | A1-1 |
| D4 | A1-2 |
| D5 | A1-3 |
| D6 | A2-1 |
| D7 | A2-2 |
| D8 | A2-3 |
| D9 | A3-1 |
| D10 | A3-2 |
| D11 | A3-3 |
| D12 | A4-1 |
| D13 | A4-2 |
| D14 | A4-3 |
| D15 | A5-1 |

| ASSIMILATOR BIT POSITION | SUM | CARRY |
|---|---|---|
| 15 | A0-1 | A0-C |
| 16 | A0-2 | |
| 17 | A0-3 | |
| 18 | A1-1 | A1-C |
| 19 | A1-2 | |
| 20 | A1-3 | |
| 21 | A2-1 | A2-C |
| 22 | A2-2 | |
| 23 | A2-3 | |
| 24 | A3-1 | A3-C |
| 25 | A3-2 | |
| 26 | A3-3 | |
| 27 | A4-1 | A4-C |
| 28 | A4-2 | B1-C |
| 29 | A4-3 | |
| 30 | A5-1 | A5-C |
| 31 | A5-2 | B2-C |
| 32 | A5-3 | |
| 33 | A6-1 | A6-C |
| 34 | A6-2 | B3-C |
| 35 | A6-3 | |
| 36 | B3-3 | A7-C |
| 37 | B4-1 | B4-C |
| 38 | B4-2 | |
| 39 | B4-3 | |
| 40 | B5-1 | B5-C |
| 41 | B5-2 | |
| 42 | B5-3 | |
| 43 | B6-1 | B6-C |
| 44 | B6-2 | |
| 45 | B6-3 | |
| 46 | B7-1 | B7-C |
| 47 | B7-2 | |

| B ADDER POSITION | A ADDER POSITION |
|---|---|
| B1-1 | A5-2 |
| B1-2 | A5-3 |
| B1-3 | A6-1 |
| B2-1 | A6-2 |
| B2-2 | A6-3 |
| B2-3 | A7-1 |
| B3-1 | A7-2 |
| B3-2 | A7-3 |

FIG. 6A
D REGISTER AND ADDER B
(WIRING CHART)

FIG. 6B
ASSIMILATOR
(WIRING CHART)

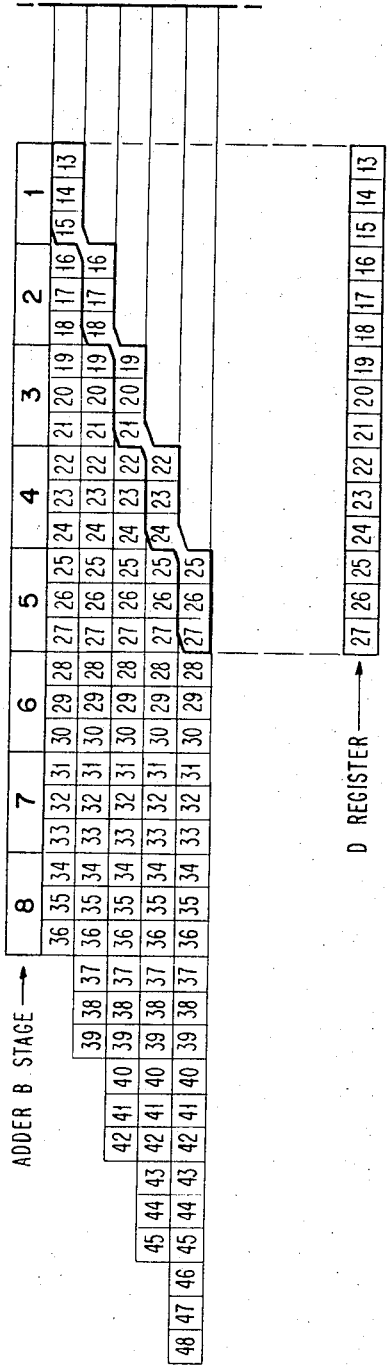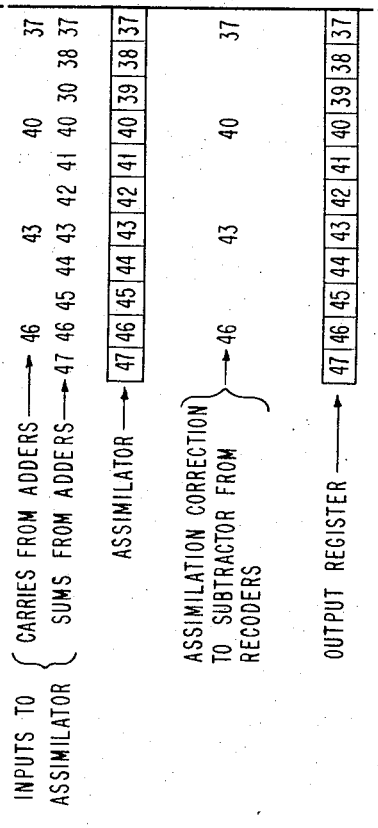
RESULT BIT WEIGHT DISTRIBUTION
IN SYSTEM DURING OPERATION
FIG. 7A

RESULT BIT WEIGHT DISTRIBUTION IN SYSTEM DURING OPERATION

FIG. 7C

BIT WEIGHT CHART OF CONTENTS OF MULTIPLICAND REGISTER DURING MULTIPLE GENERATION

MULTIPLE GENERATOR B | MULTIPLE GENERATOR A

T0 (INITIAL CONTENTS):
| 23 | 22 | 21 | 20 | 19 | 18 | 17 | 16 | 15 | 14 | 13 | 12 | 11 | 12 | 11 | 10 | 9 | 8 | 7 | 6 | 5 | 4 | 3 | 2 | 1 | 0 | X | X |

T1:
| 23 | 23 | 23 | 22 | 21 | 20 | 19 | 18 | 17 | 16 | 15 | 14 | 0 | 0 | 12 | 11 | 10 | 9 | 8 | 7 | 6 | 5 | 4 | 3 | 2 | 1 |

T2:
| 23 | 23 | 23 | 23 | 23 | 22 | 21 | 20 | 19 | 18 | 17 | 0 | 0 | 0 | 0 | 12 | 11 | 10 | 9 | 8 | 7 | 6 | 5 | 4 |

T3:
| 23 | 23 | 23 | 23 | 23 | 23 | 23 | 22 | 21 | 20 | 0 | 0 | 0 | 0 | 0 | 0 | 12 | 11 | 10 | 9 | 8 | 7 |

T4:
| 23 | 23 | 23 | 23 | 23 | 23 | 23 | 23 | 23 | 23 | 0 | 0 | 0 | 0 | 0 | 0 | 0 | 0 | 12 | 11 | 10 |

← USED FOR SIGN DETERMINATION

FIG. 7D

| MULTIPLE GENERATOR A | | | | | | | | | | | | | |
|---|---|---|---|---|---|---|---|---|---|---|---|---|---|
| X | X | 12 | 11 | 10 | 9 | 8 | 7 | 6 | 5 | 4 | 3 | 2 | 1 | 0 | 1ST. MULTIPLE |
| X | X | 11 | 10 | 9 | 8 | 7 | 6 | 5 | 4 | 3 | 2 | 1 | 0 | X | 2ND. MULTIPLE |
| X | X | 11 | 10 | 9 | 8 | 7 | 6 | 5 | 4 | 3 | 2 | 1 | 0 | X | } SUM=3RD. MULTIPLE |
| X | X | 12 | 11 | 10 | 9 | 8 | 7 | 6 | 5 | 4 | 3 | 2 | 1 | 0 | |
| X | X | 10 | 9 | 8 | 7 | 6 | 5 | 4 | 3 | 2 | 1 | 0 | X | X | 4TH. MULTIPLE |
| T4 | | | T3 | | | T2 | | | T1 | | | T0 | | | TIME |

| MULTIPLE GENERATOR B | | | | | | | | | | | | | |
|---|---|---|---|---|---|---|---|---|---|---|---|---|---|
| 23 | 23 | 23 | 23 | 23 | 22 | 21 | 20 | 19 | 18 | 17 | 16 | 15 | 14 | 13 | 1ST. MULTIPLE |
| 23 | 23 | 23 | 23 | 22 | 21 | 20 | 19 | 18 | 17 | 16 | 15 | 14 | 13 | 12 | 2ND. MULTIPLE |
| 23 | 23 | 23 | 23 | 22 | 21 | 20 | 19 | 18 | 17 | 16 | 15 | 14 | 13 | 12 | } SUM=3RD. MULTIPLE |
| 23 | 23 | 23 | 23 | 23 | 22 | 21 | 20 | 19 | 18 | 17 | 16 | 15 | 14 | 13 | |
| 23 | 23 | 23 | 22 | 21 | 20 | 19 | 18 | 17 | 16 | 15 | 14 | 13 | 12 | 11 | 4TH. MULTIPLE |
| T4 | | | T3 | | | T2 | | | T1 | | | T0 | | | TIME |

MULTIPLICAND
BIT WEIGHT CHART FOR MULTIPLICAND
MULTIPLE GENERATORS
(NEGATIVE MULTIPLES ARE THE 1'S COMPLEMENTS)

FIG. 7E

RESULT BIT WEIGHT CHART (ILLUSTRATING TRANSFER OF CONTENTS FROM ADDER B TO ADDER A AFTER COMPLETION OF SERIAL ADDITION)

Jan. 30, 1968  JUI-MING LEE ETAL  3,366,780
SHIFT MULTIPLIER
Filed Nov. 29, 1965  25 Sheets-Sheet 22

LONGHAND
MULTIPLICATION OF EXAMPLE

```
           0 0 0 0 0 0 1 0 0 1 1 0 0 1 0 1 0 0 0 0 0 0 0 0
                     0 0 0 0 0 0 0 0 1 1 1 1 1 1 1 1 0 0 0 0 0 0 0 0
           ───────────────────────────────────────────────
                   1 0 0 1 1 0 0 1 0 1 0 0 0 0 0 0 0 0 0 0 0 0 0 0
                 1 0 0 1 1 0 0 1 0 1 0 0 0 0 0 0 0 0
               1 0 0 1 1 0 0 1 0 1 0 0 0 0 0 0 0 0
             1 0 0 1 1 0 0 1 0 1 0 0 0 0 0 0 0 0
           1 0 0 1 1 0 0 1 0 1 0 0 0 0 0 0 0 0
         1 0 0 1 1 0 0 1 0 1 0 0 0 0 0 0 0 0
       1 0 0 1 1 0 0 1 0 1 0 0 0 0 0 0 0 0
           ───────────────────────────────────────────────
PRODUCT---0 0 0 0 0 0 0 0 0 0 0 0 0 1 0 0 1 1 0 0 0 0 0 0 0 1 1 0 1 1 0 0 0 0 0 0 0 0 0 0 0 0 0 0 0 0 0 0
```

RECODING OF
MULTIPLIER FOR EXAMPLE

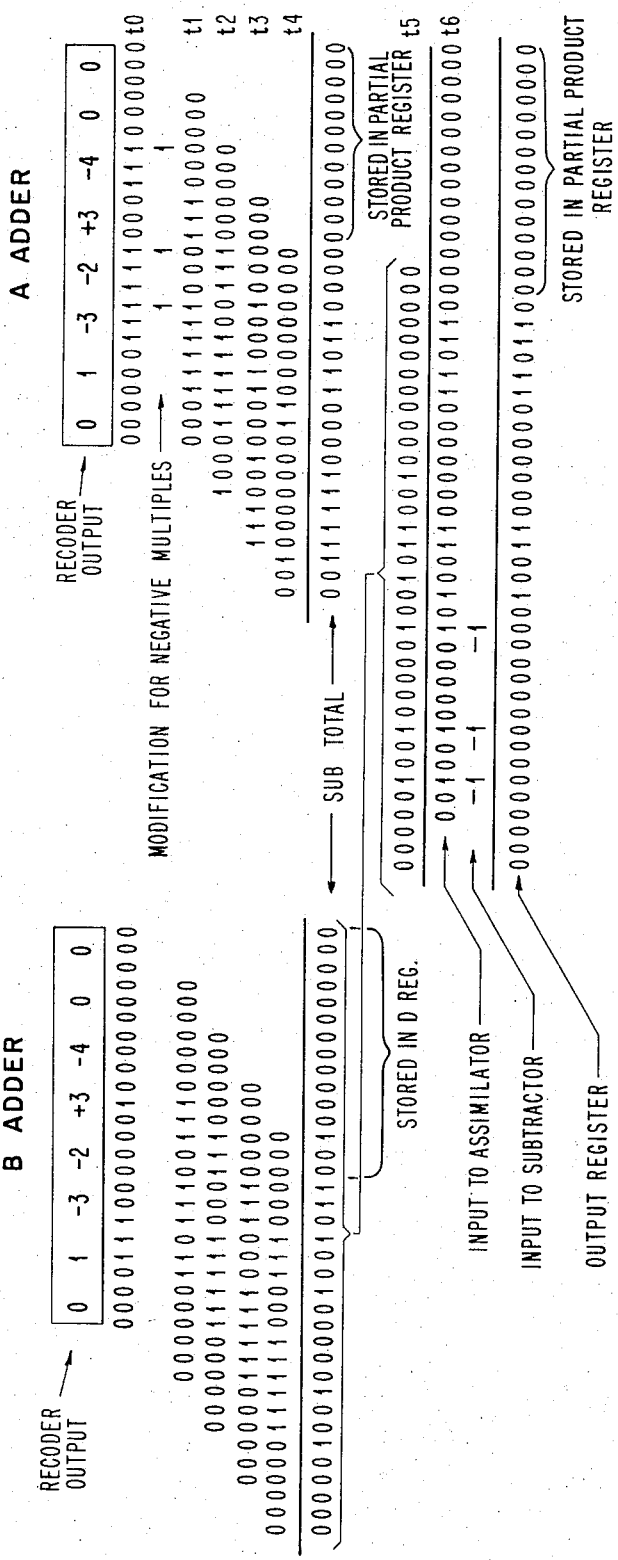
FIG. 8B APPROXIMATION OF MULTIPLICATION OPERATION IN SYSTEM

FIG. 8D
OUTPUT OF MULTIPLE GENERATORS FOR EXAMPLE

MULTIPLE GENERATOR A

| BYTE NO. | 1 MULTIPLE | 2 MULTIPLE | 3 MULTIPLE | 4 MULTIPLE |
|---|---|---|---|---|
| 1 | 000 | 000 | 000 | 000 |
| 2 | 000 | 000 | 000 | 000 |
| 3 | 100 | 000 | 100 | 000 |
| 4 | 111 | 111 | 110 | 110 |
| 5 | XX1 | XX1 | X11 | XX1 |

MULTIPLE GENERATOR B

| BYTE NO. | 1 MULTIPLE | 2 MULTIPLE | 3 MULTIPLE | 4 MULTIPLE | -(3-1) MULTIPLE | |
|---|---|---|---|---|---|---|
| 1 | 011 | 111 | 010 | 111 | 100 | MODIFIED COMPLEMENT FOR HIGH ORDER |
| 2 | 000 | 000 | 001 | 001 | 110 | |
| 3 | 000 | 000 | 000 | 000 | 111 | |
| 4 | 000 | 000 | 000 | 000 | 111 | |
| 5 | 000 | 000 | 000 | 000 | 111 | |

| BIT POSITIONS | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| MULTIPLICAND | 0 | 0 | 0 | 0 | 0 | 0 | 0 | 0 | 0 | 1 | 1 | 1 | 1 | 1 | 1 | 1 | 0 | 0 | 0 | 0 | 0 | 0 | 0 | 0 |

FIG. 8E

MULTIPLICAND BITS ACTUALLY GATED
TO A AND B ADDERS FROM SELECTORS

A ADDER

| ADDER POSITION | 1 | 2 | 3 | 4 | 5 | 6 | 7 | 8 |
|---|---|---|---|---|---|---|---|---|
| MULTIPLE REQUIRED | 0 | 0 | -4 | +3 | -2 | -3 | +1 | 0 |
| T0 | 000 | 000 | 111 | 000 | 111 | 111 | 000 | 000 |
| T1 | 000 | 000 | 111 | 000 | 111 | 111 | 000 | 000 |
| T2 | 000 | 000 | 111 | 100 | 111 | 011 | 100 | 000 |
| T3 | 000 | 000 | 001 | 110 | 000 | 001 | 111 | 000 |
| T4 | 000 | 000 | XX0 | X11 | XX0 | X00 | XX1 | 000 |

TIME

B ADDER

| T0 | 000 | 000 | 000 | 010 | 000 | 100 | 011 | 000 |
|---|---|---|---|---|---|---|---|---|
| T1 | 000 | 000 | 110 | 001 | 111 | 110 | 000 | 000 |
| T2 | 000 | 000 | 111 | 000 | 111 | 111 | 000 | 000 |
| T3 | 000 | 000 | 111 | 000 | 111 | 111 | 000 | 000 |
| T4 | 000 | 000 | 111 | 000 | 111 | 111 | 000 | 000 |

TIME

United States Patent Office 3,366,780
Patented Jan. 30, 1968

3,366,780
SHIFT MULTIPLIER
Jui-Ming Lee, Ossining, and Meir Lehman, New York,
N.Y., assignors to International Business Machines Corporation, Armonk, N.Y., a corporation of New York
Filed Nov. 29, 1965, Ser. No. 510,324
11 Claims. (Cl. 235—164)

ABSTRACT OF THE DISCLOSURE

The present system comprises a multiplication unit for use in electronic computers and the like and utilizes a serial-parallel configuration. The system operates in a serial-parallel mode to produce partial products and subtotals until all partial products of the multiplier and multiplicand have been generated. At this point the system switches to a fully parallel mode of operation. The system comprises means for serially generating multiples of the multiplicand and accumulating partial products in an adder array and means for concurrently extracting the true sum p-bits at a time from the low order end of the final product and storing same in a partial product register until all the partial products have been placed in said adder array. Control is then switched to transfer the contents of the entire adder array in parallel to a fully parallel assimilator where pseudo-sums and carries currently in the adder array are converted into a single true sum which together with the contents of said partial product register form the complete product of the operation.

---

The present invention relates to a multiplication unit for an electronic computer. More particularly, it relates to such a multiplication unit utilizing both serial and parallel portions.

In the current highly developed state of the electronic computer art, system designers are faced with two primary considerations. The first of these is a cost per computation figure which stated in other words means how much it will cost to solve a particular problem. This is closely related, for example, to the cost of performing a multiplication or some other conventional operation. The cost of implementing a particular device and its impact on the computation cost may be estimated.

The other factor which must be considered is the speed of computation which is in part dependent on the time to perform a particular operation. With any given technology one general principle is present. This is that the faster the machine, the more expensive the machine will be though other costs such as software and sales may remain fixed. Thus, if the speed increases at a rate in excess of the increase in computing costs it is possible that the total cost per computation may, in fact, be reduced despite the fact that the cost of the arithmetic unit may increase. It is this latter fact that continually spurs on the search for newer technologies and also for new system designs offering reasonable balance between cost and speed to result in an optimized machine.

In the area of machine design two principal methods are known in the art of performing operations. These are referred to as serial and parallel machine organizations. As applied to multiplier circuits, in the simplest serial method each partial product is added serially one bit at a time to the previous partial product in a serial fashion. Thus, as will be appreciated, if two ten bit numbers are to be multiplied together in the serial machine, ten times ten adder-times plus the number of additional bit-times for carry ripple and the like are required to perform the multiplication.

In the simpler fully parallel multiplier the bits of the partial products are added fully concurrently. There will be as many addition operations as there are partial products and as is well known, there are nominally as many partial products as there are bits in the multiplier. Therefore, ideally if two ten bit numbers were being multiplied together in a fully parallel machine with a stored carry adder, only ten adder-times would be required. However, in the parallel machine additional time must be allowed for carry ripple through the parallel adder or assimilator, thus increasing the time from the ideal.

In the past, most computers have utilized multipliers of either the serial or parallel types. As will be apparent, the serial is much slower but obviously much less expensive. The current trend of the technology is to utilize far more complex parallel multipliers. Since the advance of integrated circuit technology the cost of production of large parallel multipliers has been greatly reduced. However, with the current trend of making both multiplier and multiplicand in large scientific machines larger and larger, i.e., more bit positions even in excess of 100 bits, at some point it becomes excessively expensive if not technologically impossible to build a completely parallel multiplier even with integrated circuit technology due to the excessively large number of components and interconnections.

It has now been found that the time advantages of the completely parallel multiplier may be approached while at the same time saving a considerable quantity of logical circuitry and interconnections by combining features of serial and parallel multiplication in a single shift multiplier.

It is accordingly a primary object of the present invention to provide a high speed serial-parallel multiplier, termed for the purposes of the present description a shift multiplier.

It is another object to provide such a multiplier which operates on the multiplicand in a serial-by-byte, parallel-by-bit mode.

It is another object to provide such a multiplier which recodes the multiplier and generates and selects multiples of the multiplicand in accordance with such recoding.

It is a further object to provide such a multiplier which may utilize adder-subtractor elements for the purpose of system operations.

It is another object to provide such a multiplier which may utilize both positive and negative multiples of said multiplicand to increase the speed of multiple generation and economize components.

It is yet another object to provide such a multiplier which segments the multiplicand and performs operations on said segments concurrently to increase the speed of the operation.

It is a still further object to provide such a multiplier which generates a plurality of sums and pseudo sums concurrently and recombines same to form a single pseudo sum.

It is yet another object to provide such a multiplier which assimilates the concurrently generated pseudo sums.

It is yet another object to provide such a multiplier which may perform the final correction necessitated by the existence of a negative multiplicand concurrently with the existence of negative multiples of the multiplicand in given segments of the product.

The foregoing and other objects, features and advantages of the invention will be apparent from the following more particular description of a preferred embodiment of the invention, as illustrated in the accompanying drawings.

In the drawings:

FIG. 1 is a functional block diagram of the system.

FIGS. 2A through 2J constitute a logical schematic diagram of a preferred embodiment of a system incorporating the features of the present invention.

FIG. 3 is a detailed drawing showing the contents of one of the selector boxes of FIGS. 2B through 2E.

FIG. 4 is a detailed drawing illustrating the logical contents of one of the adder boxes of FIGS. 2F through 2I.

Figure 5B:
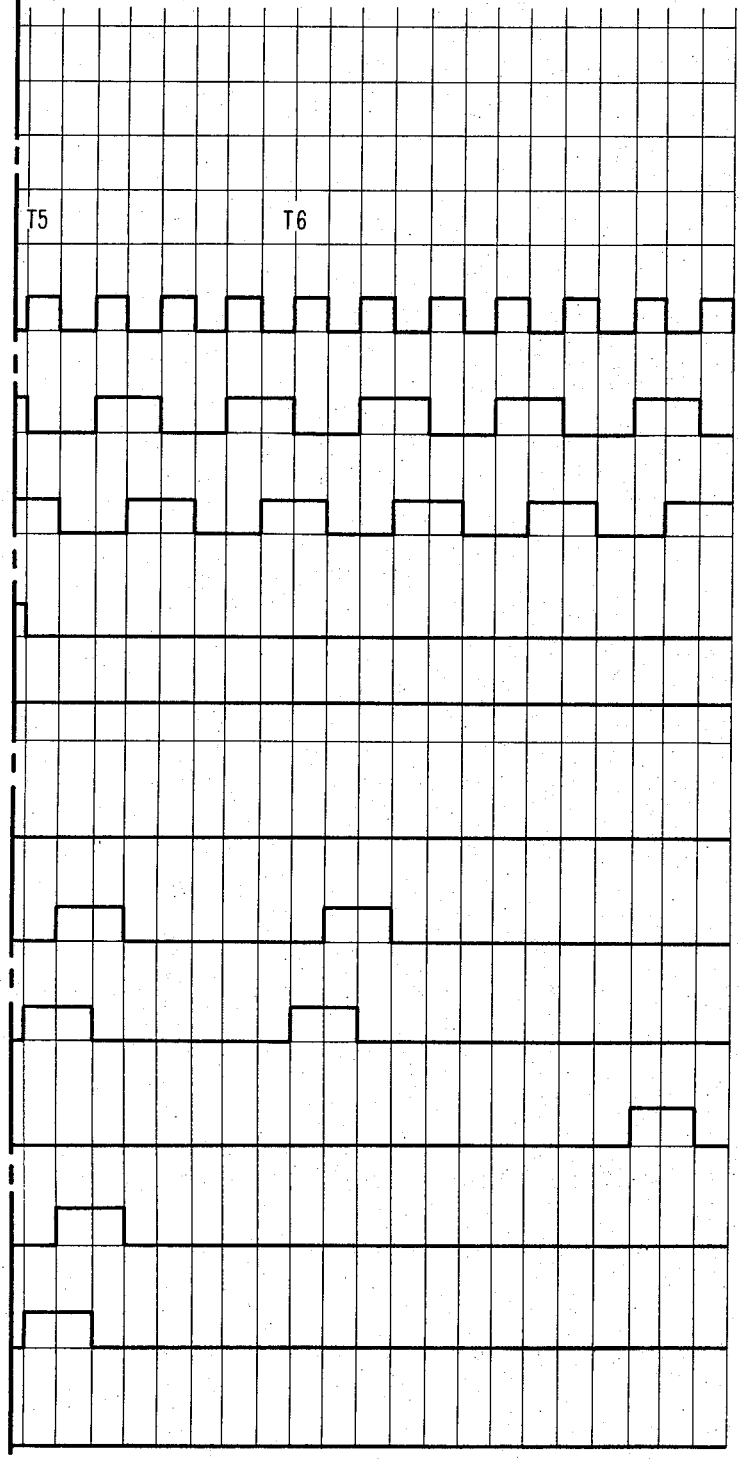

FIG. 5 is an organizational drawing showing the relationship of FIGS. 5A and 5B.

FIGS. 5A and 5B constitute a timing chart for the system of the present invention.

FIGS. 6A and 6B constitute wiring charts for the interconnection of the adder A, D register, and adder B.

Figure 7B:
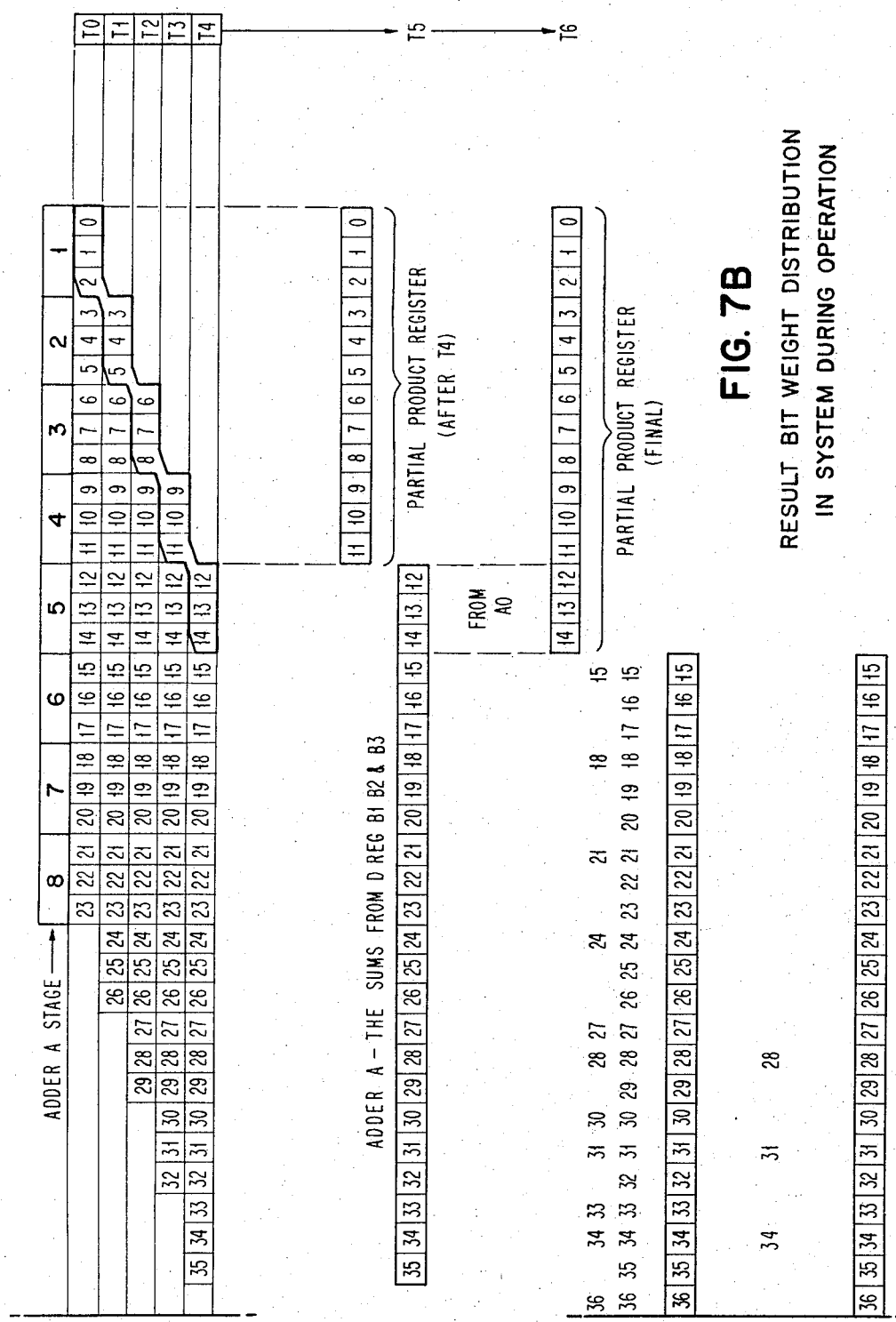

FIGS. 7A and 7B constitute result bit weight charts illustrating the contents of the various major functional units of the system during a typical operation.

FIG. 7C is a multiplicand bit weight chart illustrating the contents of the multiplicand register at different stages of the system operation.

FIG. 7D is a bit weight chart illustrating the generation of multiples of the multiplicand by the multiple generators.

FIG. 7E is a result bit weight chart illustrating the transfer of the contents of the adder B to the adder A after completion of serial addition.

Figures 8A, 8C:
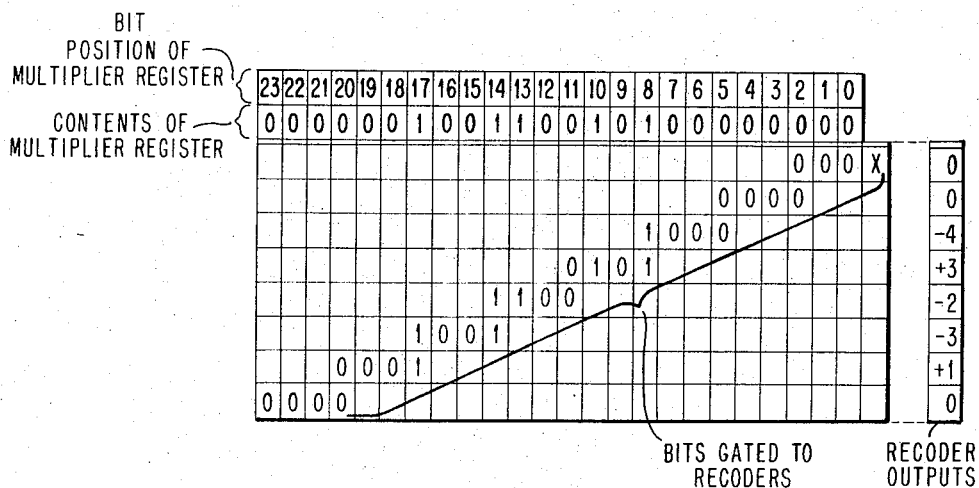

FIG. 8A is a chart illustrating the longhand multiplication of typical binary operands.

FIG. 8B is a figure similar to FIGS. 7A and 7B illustrating the operation of the present system with the specific operands illustrated in FIG. 8A.

FIG. 8C is a chart illustrating the recording of the multiplier for the example of FIG. 8A.

FIG. 8D is a table illustrating the output of the multiple generators A and B for the particular example illustrated in FIG. 8A.

FIG. 8E is a chart showing the actual bits gated to the adders A and B from the selectors.

The objects of the present invention are accomplished in general by a shift multiplier comprising a multiplicand and a multiplier register. Means are provided for recording a multiplier of $n$ bits, $r$ bits at a time and for generating multiples of the multiplicand $p$ bits at a time. An adder array means is provided including at least $n/r$ boxes within the array wherein each box comprises a $p$ bit parallel adder stage. Selection means are provided for serially gating $p$ bits of the multiplicand multiples into the adder array under control of the recorded version of the multiplier. The adder array includes output means for gating $p$ bits at a time from the low order end of the adder array into a partial product register. Means are provided for serially gating successive $p$ bit groups of the multiplicand to the multiple generation means and for gating successive $p$ bit groups of the multiplicand multiple into the adder array and system control means to continue the gating of $p$ bits of the multiplicand multiples to the adder array until all of the multiplicand has been entered into the adder array. Means responsive to said control means are provided to transfer the contents of the adder stages in parallel to the assimilator once said multiplicand has been entered in its entirety into the adder array. The output of said assimilator is connected to an output register, the contents of which together with said partial product register form the complete product of the multiplication.

Thus, the invention in its broadest aspect comprises serially generating and accumulating partial products in an adder array while concurrently extracting the true sum $p$ bits at a time of the low order end of the final product and storing same in a partial product register until all of the partial products have been placed in the adder array and then switching control to transfer the contents of the entire adder array in parallel into an assimilator where the pseudo sums and carries currently in the adder array may be converted into a single true sum which together with the contents of the previously mentioned partial product register form the complete product of the number.

According to a further aspect of the invention, the multiplicand is sequentially multiplied $p$ bits at a time with the multiplier wherein $p$ is chosen to be 3 bits in the disclosed embodiment and wherein each of the adder boxes in an adder array will contain three full adder stages. Further, the multiplicand is broken into $q$ segments and the partial products of each segment multiplied with the multiplier are concurrently placed in $q$ adder array ($q=2$ in the disclosed embodiment). Each adder array operates in an identical fashion until all of the multiplicand has been examined and placed in the array under control of the recorded multiplier and each array has its own partial product register. However, a true partial product exists only in the partial product register associated with the low order array as will be apparent from the following description of the system operation and from general numerical theory.

Thus, the contents of the partial product registers associated with the higher order arrays and the contents of the arrays themselves overlap insofar as they contain partial products or subtotals of the final product. Thus, where the multiplicand is broken into $q$ segments requiring the use of $q$ adder arrays an additional step must be added after the final entry of the highest order $p$ bits of the multiplicand into the adder arrays to effect an addition of the overlap positions of the two adder arrays before final assimilation. This is achieved in the present system by appropriately gating the outputs from the high order partial product register and the appropriate boxes and stages of the high order adder array.

In the disclosed embodiment of the system, the multiplier is recorded four bits at a time to produce one of nine possible outputs ranging from $+4$ to $-4$. The multiplicand is operated on and multiples thereof generated three bits at a time. In the present embodiment $p=3$. Also, it is assumed that both the multiplicand and multiplier lengths are equal, i.e., $m=n$ and are equal to 24 bits. Further, the multiplicand is being divided into segments of 11 and 13 bits respectively, with $q=2$.

It should be clearly understood that the above numbers are chosen solely for the sake of convenience and are not to be construed as limiting upon the scope of the invention.

To summarize the major phases of the invention, four operations are involved. The first general operation includes the recoding of the multiplier. The generation of appropriate multiples of the multiplicand and their serial gating into the adder arrays under control of the recoded multiplier until the entire multiplicand has been processed constitutes the second operation. At the end of this stage all multiples have been generated and, in effect, all of the partial products are in the adder arrays.

During the third operation the overlap of the subtotals produced by each of the adder arrays must, in effect, be compensated for; that is, the subtotals combined wherein overlap exist so that a single pseudo sum exists in the adder arrays which can be directly transferred to the assimilator.

The fourth operation is one of assimilation wherein the sum outputs from the adder array are combined with the carry outputs from the individual boxes and appropriate assimilation of all carries is effected.

In a positive multiple system the fourth operation would be the last. However, with the particular embodiment of a system disclosed in the present invention, both positive and negative multiples are utilized. Thus, instead of generating all of the multiples 0 through 7 for octal base recoding operation the present system is able to recode utilizing the multiples $-4$ through $+4$. As will be appreciated, this necessitates the generation of only 3 multiple since the 1 and 2 multiple may be obtained by appropriate interconnection. The negative multiples are merely the 1's complement of the positive multiples and subsequent provision is made for entering a 1 in the appropriate adder stage where a negative multiple exists thereby effecting a proper operation in the adder for the case of the negative multiple thereby achieving the same effect as would be attained by a further alternative system using only positive multiples 0–4 and an adder-subtractor network.

The invention will now be described with reference to the accompanying drawings wherein a preferred embodiment of the invention is set forth. The FIGURE 1 is a functional block diagram of the system and illustrates the major functional units thereof. Referring to the figure, this system comprises the multiplicand register 2 which is broken into a low order and high order portion respectively and a multiplier register 4. The output from the multiplicand register goes to the multiple generators A and B having reference numerals 8 and 10 which generate the low and high order multiples of the multiplicand respectively, and the outputs of the two multiple generators pass in turn to the two selectors 12 and 14. It should be noted that the multiplicand is presented to the multiple generators 3 bits at a time, i.e., $p=3$, whereby multiples are generated 3 bits at a time. The specific multiple to be selected for an appropriate position of the multiplier is determined by the recoder 6 which examines or recodes the multiplier 3 bits at a time. It should be noted that each recoder segment examines 4 bits of the multiplier wherein the neighboring high order bit of one group becomes the low order bit of the other. However, this operation will be explained in more detail subsequently. As stated previously, the output from the recoder 6 is transferred to the two selectors 12 and 14. The function of the selector is to cause the proper multiple of the multiplicand to be gated into the appropriate adder box in accordance with the recoded multiplier bit controlling said box. The outputs from the selector in turn become the inputs to the two adder arrays A and B. As stated previously, each adder array must contain as many boxes as there are segments of the recoder, that is, $n/r$. Additionally, each box must contain as many full adder stages as there are bits ($p$) being processed concurrently in the multiplicand.

Figure 2B:
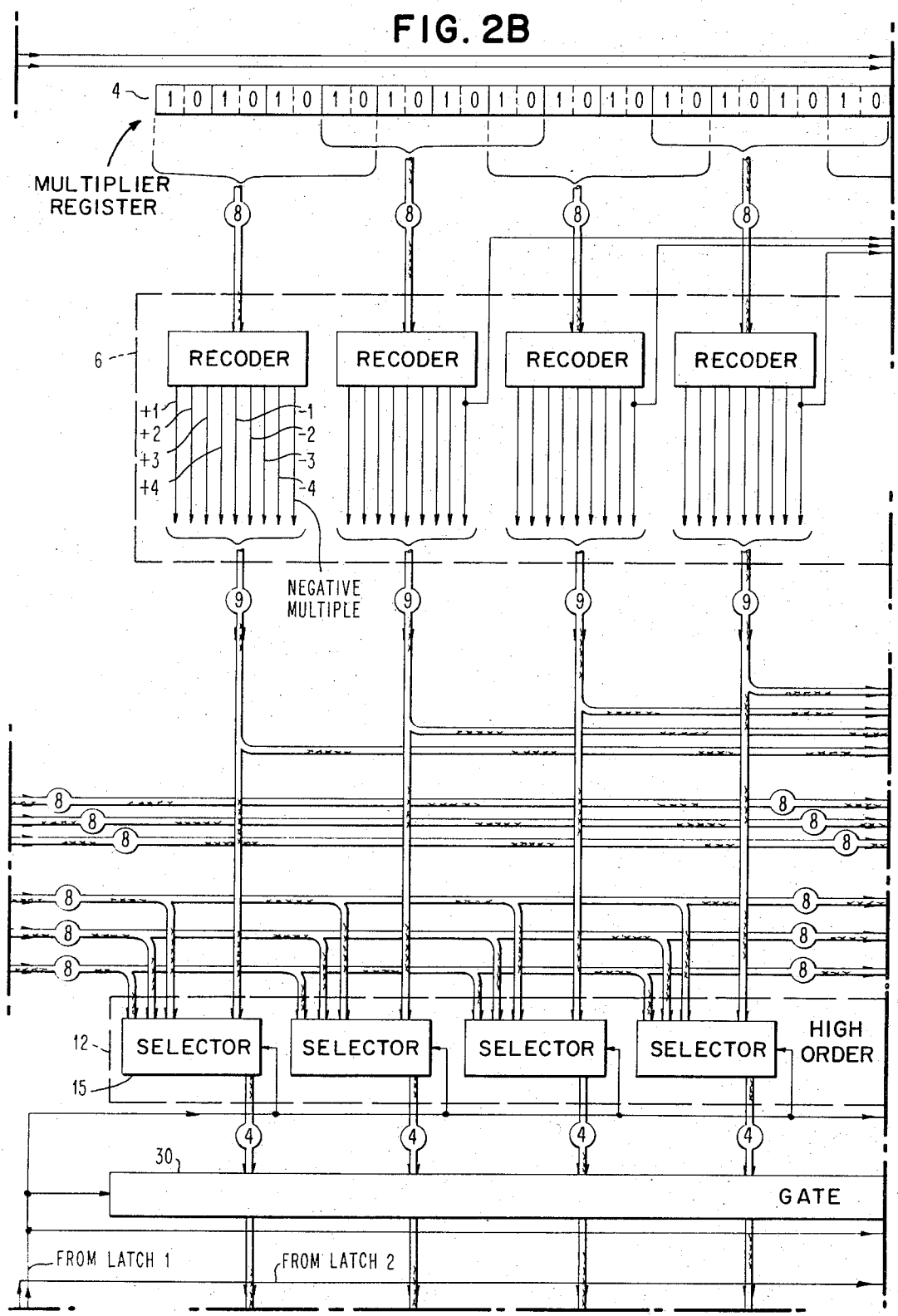
FIG. 2 is an organizational chart showing the relative location of FIGS. 2A through 2J.
Figure 2J:
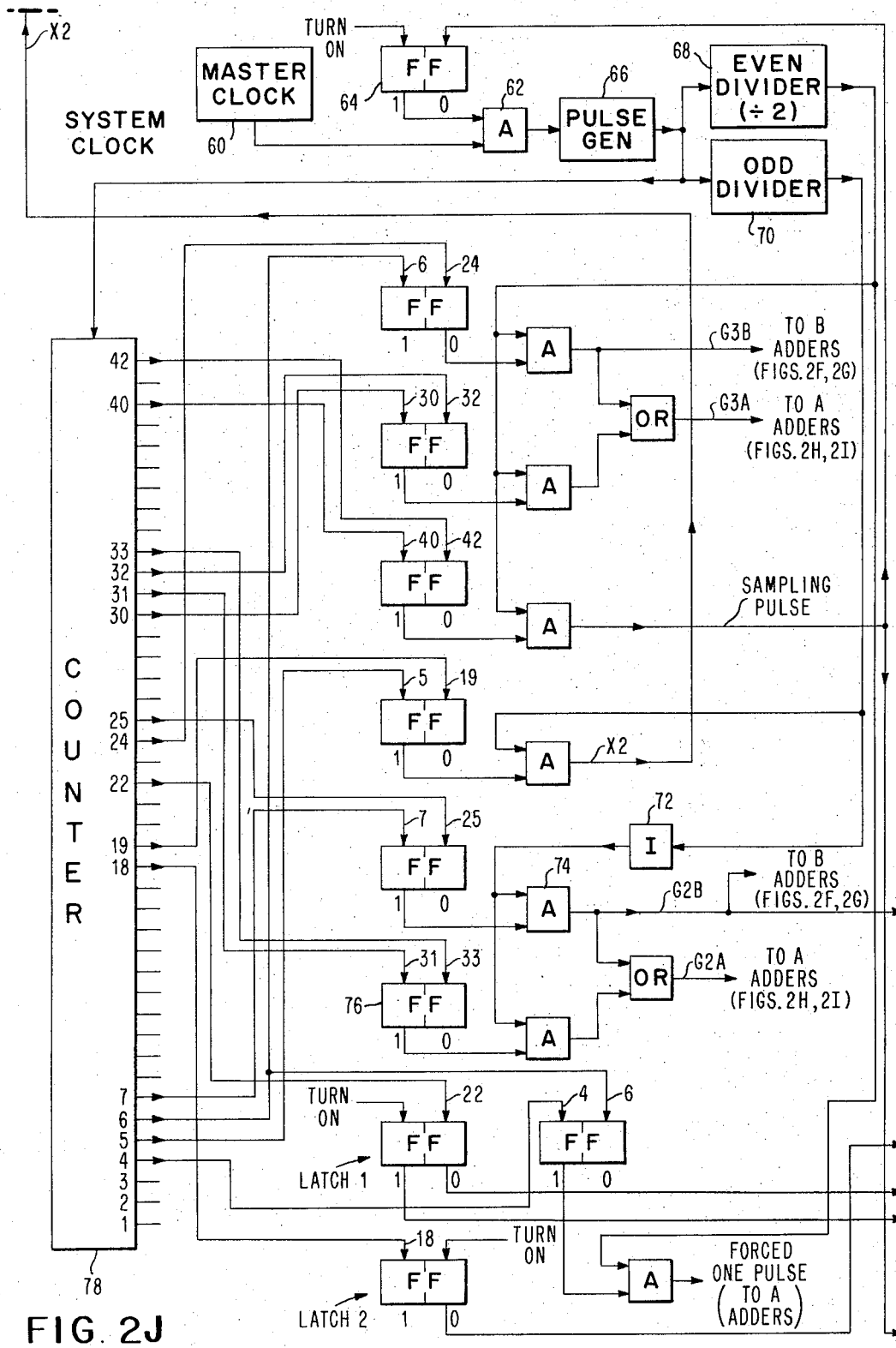

Each adder array is essentially self-contained and the pseudo sum bits are propagated appropriately from box to box under control of the system clock which is illustrated in FIG. 2J. The carry stays within the box since the next higher order segment will appear therein during the next byte time. The successive three bit outputs from the low order end of the two adder arrays A and B are stored in the partial product registers 18 and 22 wherein the register 22 is the low order partial product register and will receive bits which will become a portion of the final product in true form. However, the D register 18 is a pseudo partial product register for the B adder array and the contents of this register must subsequently be gated into the A adder array to properly add the subtotals, as described previously, before assimilation. After the addition of the subtotals, the contents of the two adder arrays A and B transfer into the assimilator 24 where a true sum is generated and transferred to the output register 28. It will be noted that the high order end of the assimilator 24 passes through the subtractor 26 which receives an input from the correction circuitry 36. Actually, this input is a combination of a determination made based on the output of the recoder 6 and also an examination of the sign bit of the multiplicand which latter examination actually occurs in the multiple generator B indicated by reference numeral 10. These two results are combined in the correction circuitry 36 shown on FIGS. 2D and 2E and whose purpose and operation will be described subsequently.

The details of the system shown in FIG. 1 appear in the composite of FIGS. 2A through 2J wherein the same reference numerals are utilized to refer to blocks of the systems as are shown as blocks in FIG. 1. This figure constitutes a partial logical schematic diagram and a somewhat more detailed functional block diagram. The contents of the adder boxes are shown in detail in FIG. 4 and the contents of a selector box are shown in detail in FIG. 3. The other functional boxes are thought to be sufficiently well known in the art as not to necessitate detailed descriptions as they are readily available in the literature. For example, the multiple generators A and B may be of any convenient type. For example, the generation of the positive multiple could be performed as illustrated in the book, "Arithmetic Operations in Digital Computers," by R. K. Richards on pages 158 and 159, D. Van Nostrand Co., Inc., copyright 1955. Assimilators are also well known in the field of fully parallel multipliers.

FIG. 2A shows the high and low order positions of the multiplicand register 2 and further, shows the shifting pulse input for same. Connected to the output of the multiplicand register are the multiple generators A and B, each of which have three bundles of output lines representing the multiples formed by said generators which are then passed over the indicated cables into the selector boxes 12. As will be noted on FIGS. 2B and 2E, the outputs from the multiple generator A are passed in parallel into all positions of the selector 14 and all of the outputs of the multiple generator B are passed over the appropriate cables to all positions of the selector 12. Depending upon the output of the particular recoder 6, one of the multiples from −4 to +4 will be selected and particular data appearing on those lines will be gated into the adder box associated with the particular selector. It should perhaps be noted that there is no 0 line shown in the output from the recoders. If a number 0 should be recoded, it merely means that none of the AND gates making up the selector will be energized and thus there will be no input into the particular box of the adder arrays. It will be noted that the outputs from each selector box pass into an associated position or box of the A adder and B adder arrays. Thus, a number may be entered into the adder from the selectors and combined with a number from a preceding stage in a suitable time increment. Means are provided within the adder boxes for carry propagation within the box during this stage of operation. This will be explained with reference to FIG. 4 subsequently. It will be noted that the low order boxes of both the A adder and B adder arrays, A0 and B1, are connected to the first three bit locations of the registers 18 and 22. An appropriate shifting input, i.e., G2B, is applied to these registers to shift them 3 bit locations each time said pulse is applied thus allowing the next three pulses to be gated from the adder arrays into these registers. The contents of the register 22 comprise a true partial product and accordingly, may be transferred in unaltered form. However, it will be noted that the output of the D register 18 passes through the gate circuit 34 which is controlled by an appropriate pulse from the latch 1 shown on FIG. 2J to transfer the contents of the D register into the A adder during time T5. The gate 34 also controls the shifting of the contents from the B adder stages B1, B2, and B3 into the A adder also during time T5. The specific wiring and interconnection of these stages is illustrated both on the drawing and is tabulated in FIG. 6A. The wiring of the assimilator is likewise clearly shown on the drawing but for sake of clarity the wiring is also tabulated in FIG. 6B wherein the specific sum and carry inputs to each bit position of the assimilator is clearly set forth. Each stage of the subtractor 26 receives one input from an appropriate position of the assimilator and a plurality of the stages receives second inputs from the correction circuitry 36 shown at the top of FIGS. 2D and 2E. It will be noted that the correction circuitry comprises a plurality of units wherein the number of units is equal to the number of decoders minus 1. The highest order recoder does not produce a correction output because it is not needed due to the fact that there is no necessity to inject 1's in the product beyond the 48th bit. Each of the units of the correction circuitry 36 comprises one inverter circuit, two AND circuits and an OR circuit 41. The function of the unit is to produce an output from the OR circuit 41 whenever the combination of a negative multiplicand and a positive multiple or a positive multiplicand and a negative multiple occurs. The reason for this correction is that it is required when an assimilator is used. The output of the subtractor 26 together with the direct output of the assimilator 24 is transferred to the output register 28 and thus comprises the true product of the required operation together with the contents of the partial product register 22.

FIG. 3 constitutes a detailed logical schematic of one of the selector boxes 15. The selector is quite simple and straightforward in concept and merely comprises a plurality of AND gates. Thus, referring to the figure, if the recoder output indicates that the +3 multiple of the multiplicand is to be gated into the associated adder box, the AND circuits 40 will each receive one input from the +3 line from the recoder. Concurrently, a second input will be received in each of these AND circuits from the +3 lines on the cables 42, 44, and 46 from the appropriate multiple generator. It being noted that these cable numbers are not shown on FIG. 2 since the selector box is generic to both the high and low order portion of the system. The outputs from the selector box are taken from the three OR circuits 48 and passed into the appropriate stage in the related adder box. It will be noted that the negative multiple line from the recoder bypasses the selector box and enters the AND box 50 to provide a +1 input to the adder box. The other input to the AND box 50 is from the "forced one pulse" of the system clock. This results in creating the 2's complement of the negative multiple which as is well known is a conventional form of subtraction. The output from the AND box 50 goes through the OR box 52 and then sets the flip-flop 54 and this position may be utilized to enter either a 1 into the appropriate adder stage or more conventionally, to move a carry into the next order of addition. The latch 1 and latch 2 inputs to the two bottom rows of AND gates in FIG. 3 are for the purpose of preventing the gating of the multiplicand into the last two bit positions of the adder A during time T4. This is shown by the X's in the T4 column of multiple generator A of FIG. 7D where it is desired to inhibit input in the indicated adder positions.

Returning now briefly to FIG. 2 in FIG. 2J the system clock is shown. The major portion of this clock comprises the master clock 60 which produces a timing mark at approximate time intervals equal to a logic level within the system. It will be noted that the master clock 60 feeds into an AND circuit 62, the other input to which comes from the flip-flop 64. The flip-flop 64 is set to a "1" by the system "turnon" pulse which could be an electrical signal from any convenient switch, pushbutton, etc. The output of the AND circuit 62 is sent to a pulse generator 66 which in turn provides pulses to the two dividers 68 and 70. Referring now to FIGS. 5A and 5B which constitute a composite timing pulse chart, the output of the pulse generator 66 is shown in curve A and the output of the two dividers in curves B and C. The two odd and even dividers are used as convenient devices to obtain a delay between the pulses X2 and G3A and G3B. It will be noted that the pulse entitled G2A and G2B is the inverted form of the pulse X2. This inverted pulse is obtained by taking the output of the odd divider 70 and passing it through the inverter 72. The output of the inverter 72 is fed to the input of the AND circuit 74, the other input of which comes from the flip-flop 76. This flip-flop is turned on and off by the indicated output positions of the counter 78. It should be noted at this time that the output of the pulse generator 66 is fed to the counter continually and the various output lines from the counter are utilized to achieve the timing by setting and resetting the row of flip-flops shown to the right thereof. It should also be noted referring to FIGS. 5A and 5B that the upper row of numbers labeled bit times correspond chronologically to the outputs of the counter 78. Thus, at time 7, the flip-flop 76 is switched to a "1" and the pulses from the odd divider 70 are allowed to leave on the G2B and G2A lines to begin the timing of this portion of the system. The operation of the remainder of the system clock shown in FIG. 2J is obvious and will not be explained in further detail. It being noted that the various pulses shown on FIG. 5B are obtained directly from this timing circuitry. As stated previously, the basic timing sequences are obtained from the outputs of the counter which turn the various flip-flops on and off at the specified times. It should perhaps be noted that additional flip-flop means are provided respectively to obtain the timing pulses G3A and G2A during the T6 time. Since these last two pulses for G2A and G3A are not synchronous with the rest of the G2A pulses, separate flip-flops are provided, said flip-flops being turned on at times 31 and 30 respectively and turned off at times 33 and 32 respectively. The operation of the two latches, latch 1 and latch 2, is apparent as is their function to open and close the gates 30, 32, and 34 and to control the selector and gates indicated in FIG. 3.

Referring now specifically to FIG. 4, the contents of one of the adder boxes in either the A adder or B adder is shown. It will be noted that each adder box is made up of three full adder stages indicated by the reference numeral 17. The individual stages comprise a full adder including the three AND gates 80, the single OR 82, and the two exclusive OR's 84. These logical units make up the full adder whose operation is well known in the art and will not be specifically explained. It will be noted that there are two sum inputs on the indicated lines and the single carry input to the adder stage and a single carry line coming out of the OR gate 82 and a sum line coming out of the bottom of the lower of the two exclusive OR's 84. The two flip-flops 86, the two OR gates 88 and the AND gate 90 comprise essentially local storage for holding the current sum output of the adder stage and saving it for transfer into the next stage during the next input cycle to the adder array wherein the sum output from a stage becomes one of the sum inputs of the next succeeding stage. Flip-flop 56 serves the same purpose for the carry output of the bottom adder stage for recirculating the carry back into the carry input of that stage during the next cycle of operation where the succeeding contents of the stage will be the next higher order.

Referring now to the timing chart of FIGS. 5A and 5B, the various timing pulses of the system are clearly shown. Pulses A, B, and C are the basic timing pulses which are passed through the various logic devices to obtain the latch 1 and latch 2 pulses shown as curves D and E and also the pulses shown as curves F, G, H, I, J, and K. It will be noted that the X2 pulse is utilized to shift the multiplicand register 2 and the G2B pulse utilized to shift the two output registers 18 and 22. The G2A, G2B, G3A, and G3B pulses are utilized to gate the information through the adders during the various sequences of the addition operations. It should further be noted that the first four pulses of curves F, G, H, I, J, and K are utilized to perform the serial addition and the stepping of the partial products through adder arrays until all of the multiplicand has been entered into the system. The fifth pulse of curves G and H making up the G2A and G3A pulse train performs the operation of adding the contents of the D register 18, the first three stages of the B adder and the appropriate stages of the A adder. The sixth pulse of the G2A and G3A pulse trains causes the outputs from the previous additions to appear on the appropriate sum output lines where they are transferred down to the assimilators 24. The fifth pulse on the G2B and G3B lines causes the contents of the B adder to be placed on the desired output lines for subsequent transfer to the assimilator 24.

Referring now to FIGS. 6A and 6B, as stated previously, these two figures constitute wiring charts for the connection of the various stages of the A and B adders to each other and also to the assimilator and also indicate the specific wiring of the D register 18 into the A adder. The contents of these charts are thought to be self-explanatory and will not be specifically recited. It being noted that FIG. 6B indicates the carry inputs which are brought out of the bottom adder stage of the indicated adder into the indicated assimilator stage. It being further noted that the individual interstage carries are taken care of automatically within the adder boxes. It being noted that the output of the OR circuit 82 is transferred to the carry input of the next higher order stage immediately below same.

The above description of FIGS. 1–6 constitutes a description of the apparatus of the present system and is thought to clearly describe the operation and cooperative relationship of the various elements of the system. The subsequent description of FIGS. 7A through 7D and FIGS. 8A–8D are included to more clearly describe the operation of the system relative to the various sequential operations which are performed thereby. Referring to FIGS. 7A and 7B, this composite figure illustrates the operation of the invention and as the title implies, it illustrates the "result bit weight distribution in the system during operation." Referring to the figure, the upper portion thereof indicates the contents of the adder A and adder B stages during the time intervals T0–T4. It will be noted these two groups of figures are staggered. This is to indicate the three bit shifting between the time intervals. The actual numbers appearing in this figure represent the contribution to the final result which appears in the output register on the bottom line of the drawing. Thus, each horizontal line in the adder stage represents a partial product gated from the selectors into the adder stages. The vertical columns which appear under each of the adder stage numbers represent the numbers which are actually added together in the adders. The alignment and addition is, of course, obtained by shifting between the three stages during the time sequences and as a result of the clock pulses produced in the curves F–K of FIGS. 5A and 5B. At the end of time T4 the contents of the A and B adders are those indicated on the bottom line of the upper portion of the figure. The contents of the D register and partial product register are also indicated by the dotted lines connecting these two registers with the contents of the adder stages. During time T5 the contents of the A and B adders and the D register must be combined. The result of this operation is shown in the box labeled adder A—the sums from D register, B1, B2, and B3. The details of the transfer of the contents of the B adder to the A adder is shown in FIG. 7E. It being noted that the dotted portion of the B adder is transferred into the indicated dotted portion of the A adder. The wiring connections for obtaining this transfer are shown in the lower portion of FIG. 6A where the specific connections are set forth. During pulse time T6 the contents of the A and B adders are transferred down to the assimilator and to the highest 3 order positions of the partial product register (final). Concurrently, with this operation an input to the subtractor box 26 is brought from the correction circuitry 36 as outlined above. As the assimilator outputs are obtained, the upper order portion of same pass through the subtractor box and finally, into the output register as indicated. It should be noted at this time that only the sum outputs from the B adders are transfered into the A adder and that the carries are transferred directly down into the assimilator as indicated. It will, of course, be apparent that the carries must go into the proper order of the result, however, this is taken care of by the specific wiring of the assimilator as indicated in FIG. 6B.

FIG. 7C illustrates the contents of the multiplicand register during the various indicated time stages of the operation. This figure illustrates the way in which the contents of the multiplicand register are shifted whereby only the lower three order bits or those bits at the right hand end of the horizontal rows are supplied to the actual multiple generators. The X's shown in the top line under the title multiple generator A are dummy bits inserted to allow for the requisite shifts necessary to produce the two and four multiples as will be understood. The bottom row of the multiple generator B of this figure indicates that the third bit position from the right is actually utilized to determine the sign of the multiplicand which information is transmitted into the correction circuitry 36.

FIG. 7D is a chart indicating the bits of the original multiplicand as they would appear on the output lines of the multiple generator during the indicated time sequences of the operation of this system. It will be noted that all but the third multiple, which is the sum of the first and second multiple, are obtained by merely shifting the first multiple to the right one or two positions depending upon whether the second or fourth multiple is desired. Thus, the relationships of the original bits of the multiplicand relative to the output from the multiple generators A and B may readily be seen by referring to the charts of FIG. 7E.

The following tables will be described to explain the operation of the recoders and the manner in which the multiplier bits are recoded by examining the multiplier three new bits at a time while simultaneously looking at the highest order bit of the adjacent low order byte. Table I in the first line illustrates the binary number which is equal to 13. Decoding this number three bits at a time the result 1 and 5 is obtained as shown on the second line of Table I. To reconvert this number to decimal form as indicated in the table it is obviously also equal to 13. However, it will be noted that the number 5 may be represented as the number 8—3 and since the number 8 is the lowest order of the next position, the octal number may be written as 2, —3 as indicated in the bottom line of Table I. Reconverting this number to decimal as indicated also equals the original number 13.

TABLE I

| binary number | 001 101 | | =13 |
|---|---|---|---|
| octal number | 1, 5 | =8×1+5 | =13 |
| recoded octal | 1, 8 —3=2, | —3=8×2—3=13 | |

TABLE II

| 4-bit multiplier | | | | 4-bit Recoder output |
|---|---|---|---|---|
| −4 | +2 | −1 | +1 | Weight |
| 0 | 0 | 0 | 0 | 0 |
| 0 | 0 | 0 | 1 | +1 |
| 0 | 0 | 1 | 0 | +1 |
| 0 | 0 | 1 | 1 | +2 |
| 0 | 1 | 0 | 0 | +2 |
| 0 | 1 | 0 | 1 | +3 |
| 0 | 1 | 1 | 0 | +3 |
| 0 | 1 | 1 | 1 | +4 |
| 1 | 0 | 0 | 0 | −4 |
| 1 | 0 | 0 | 1 | −3 |
| 1 | 0 | 1 | 0 | −3 |
| 1 | 0 | 1 | 1 | −2 |
| 1 | 1 | 0 | 0 | −2 |
| 1 | 1 | 0 | 1 | −1 |
| 1 | 1 | 1 | 0 | −1 |
| 1 | 1 | 1 | 1 | 0 |

TABLE III

| binary number | 001 1010 |
|---|---|
| recoded using Table II | 2, −3 = 13 |

Table III illustrates the manner in which the present system examines the bytes of the multiplier insofar as overlapping the highest order bit of the next lower order byte when looking at three new bits. Table II is a truth or decoding table for the individual recoders. In the row indicated as weight, the numbers appearing above the columns in the lower portion of the table illustrate the actual weight given to the various binary bits appearing in a particular four bit segment of the multiplier as fed to the recoders. Utilizing the contents of this table, the binary number shown in Table III may be immediately decoded. Thus, the four bit number 1010 becomes −3 and the four bit number 0011 is recoded at a +2. Referring again to the bottom line marked recoded octal of Table I, this result is the same as that obtained by working the example out by hand and properly decodes back into a decimal 13. This is the system used in recoding the multiplier of the present system, the logic for taking the weighted inputs to provide the various indicated outputs would be obvious. It should be clearly understood that the disclosed multiple handling system is exemplary only as other multiple systems could equally well be utilized as mentioned previously.

Description of example

FIGS. 8A–8E constitute an example wherein binary operands are multiplied together to produce a product. This example is shown to directly illustrate the operation of the invention. FIG. 8A illustrates the straightforward multiplication of the illustrated 24 bit operands. The 48 bits of the product are illustrated, although they are obviously not all significant.

FIG. 8B is a figure similar to the composite of FIGS. 7A and 7B showing in this case however the contents of the system in binary form as would result from the actual operation of the system as described. In the first line of the two sections marked A adder and B adder, instead of the adder box numbers the actual outputs of the recoder 6 are illustrated. Each of the bracketed three bits referring to one of these outputs indicated an associated adder stage as will be readily appreciated. Thus, the successive horizontal lines of the partial products gated into the two adder arrays represent the output of the multiple generators A and B as gated into the adder arrays under control of the recoder outputs. It will be noted that under the first line in the A adder array, three 1's are indicated. As explained previously, these are the 1's that are added in under the three recoder outputs requiring negative multiples. These 1's constitute the correction necessary when adding a 1's complement to invert same to a 2's complement to effect a subtraction operation again as will be appreciated by one skilled in the art. As described previously, this operation is taken care of automatically in the adder circuitry under control of the recoder outputs and is effective to gate a 1 into the appropriate low order position of the indicated adder boxes. It will also be appreciated that this need only be done in the lowest order position as adding the 1 at this point converts the entire negative multiple which is gated into subsequent adder stages in the 1's complement form as described previously. The results of the operations of the A and B adders during the first four stages of operation is, in effect, shown in the horizontal line marked subtotals. Actually these totals represent the contents of the A and B adders and also the contents of the partial product register and the D register respectively as indicated in the figure. The next occurrence is the transfer of the subtotal obtained from the B adder which as indicated is physically stored in both the B adder and the D register into the A adder in the overlapped portion thereof and directly down into the assimilator although effective this latter operation does not occur insofar as the final product is concerned until T6 although the connections are physically made. The actual transfer is indicated in the horizontal row opposite the time sequence T5. During time T6 the current contents of the A adder enter the assimilator in the derived form, the contents of the B adder having previously entered same during time sequence T5. It will be appreciated that the assimilator produces an output very rapidly upon receiving an input, said output being transferred into the output register as indicated in the figure. The necessary correction input to the substractor is likewise indicated in the line just below the "input to assimilator." As stated previously in greater detail, this correction is necessary due to the occurrence in the example where a positive multiplicand occurs and a negative multiple is specified by the recoder outputs.

FIG. 8C is a chart illustrating the recoding of the multiplier for the example. The upper figures of this chart illustrate the bit positions of the multiplier register in the top line and the actual binary contents of the register in the second line. The way in which these bits are broken into four bit groups is illustrated in the subsequent horizontal staggered rows and the actual outputs of the recoders is indicated in the vertical column to the right of the chart. The manner in which these recoder outputs are obtained is clearly illustrated in the previously described Table II. For example, the four bit binary number 1100 appearing in the fifth row of the chart decodes according to the present system as −4, +2, 0, 0 as the weights of said four bit number. This obviously produces an output of −2. The recoder outputs illustrated in FIG. 8C appear along the top line of FIG. 8D and illustrate the adder boxes and the selectors into which these outputs are transferred.

FIG. 8D is a chart illustrating the output of the multiple generators A and B. It will be noted that only the positive multiples are shown for the multiple generator A as the negative multiples are merely the 1's complement of the respective positive multiple illustrated. For example, the −3 multiple appearing on the −3 line from the multiple generator A in the fourth byte would be 001 since the postive multiple appearing in the chart is 110. It will be noted that the modified −3 multiple appearing in the output of the multiple generator B is specifically shown to illustrate the correction necessary in the high order side −3 multiple as described previously and as performed by the subtractor shown in FIG. 2A adjacent the multiple generator B. The box at the bottom of FIG. 8D merely shows the actual binary multiplicand and the bit position relating to each of the binary bits.

FIG. 8E is a chart illustrating the "multiplicand bits actually gated to the A and B adders from the selectors," as a result of the multiples required as indicated in the outputs of the recoder 6 and the multiples supplied by the multiple generators A and B. It will be noted that the binary contents of FIG. 8E correspond to the binary numbers illustrated under the A and B adder contents shown on FIG. 8B.

The system having received the information from the recoders and the multiple generators proceds to serially add the partial products in the two adder arrays A and B until the end of T4 time, at which point the two subtotals indicated in FIG. 8B are available. On T5 time the contents of a portion of the B adder and the D register are transferred into the A adder and the overlap portion of these subtotals is taken care of in the A adder. The pseudo sum and carry outputs of both the B and A adders are then routed to the assimilator where the final parallel assimilation of the product is performed during T6 time together with the correction necessitated by the correction circuitry 36.

Referring back briefly to FIGS. 7A and 7B, the extent of the overlap between the subtotals obtained by the A and B adders is evident, it being noted that the right most bit of the B adder must be gated into the second stage of the fifth box of the A adder. As stated previously, this is clearly shown in the wiring chart of FIG. 6A. Similarly, the right most bit position of the D register must be gated into the second stage of the A0 box of the A adder as also shown in the wiring chart of FIG. 6A. It should finally be noted that the result indicated as ultimately appearing in the output register at the bottom of FIG. 8B is the same as the result of the longhand example appearing in FIG. 8A.

*Summary*

Having described the system with reference to the block diagram, the detailed logical schematic diagram, the bit distribution charts and the specific example it is believed that the operation of the disclosed embodiment of the present invention will be clearly understood.

As stated previously in the present embodiment, the multiplier has been recoded and the multiplicand has been broken up in 3 bit bytes, i.e., $p=3$. The multiplicand was further segmented into two segments, i.e. $q=2$ and the system disclosed along these lines. It will be apparent and should be clearly understood that the particular illustrated numbers of bits in the multiplier and multiplicand registers together with the technique for recoding as well as the various byte sizes utilized together with the necessary numbers of adder boxes and stages within each box and element types were chosen for the purpose of conveniently illustrating the principles of the present invention and should not be construed as any way limiting. As will be readily apparent, that the larger the bytes utilized in the multiplier for the purpose of recoding and base changing, the fewer will be the numbers of adder boxes necessary and similarly the larger the multiplicand bytes processed in each time cycle the less time will be required to completely enter the multiplicand into the added arrays. However, as will be readily understood, if more bits are utilized in the multiplicand bytes, more individual full adder stages within each box must be provided. Also, if a higher base number is utilized in the recorders as well as larger bytes handled in the multiplicand the multiple generators must of necessity become somewhat more complicated to be able to handle the larger number of multiples and bits.

Similarly, if the multiplicand is segmented into more than two segments, a separate multiple generator, selector matrix and adder array must be provided for each segment as well as the various controls necessary for correctly combining the subtotals prior to the final assimilation step.

It will also be readily understood that an alternative configuration of the particular system clock could readily be designed and that the particular clock shown was convenient for the purpose of illustrating the invention but similarly it is not intended to limit the same.

The system of the present invention is able to perform a multiplication in a period of time considerably less than that required for any of the known serial multipliers and in fact can approach as closely as desired the speed of a fully parallel multiplier.

In general it has been found that the instant shift multiplier will produce a better cost-speed product than a fully parallel multiplier of the same speed. For example, in an early implementation of this system a cost-performance advantage of three was determined. That is only one third as much hardware as was required for the same speed of operation.

Furthermore, the present multiplier is topologically adapted for implementations using integrated circuit and monolithic logic technology due to its highly repetitive parallel structure and the minimization of interconnections. As stated previously its advantages become more apparent as operand length increases and may make implementable high speed multipliers which could not be realized using the purely parallel configurations.

While the invention has been particularly shown and described with reference to a preferred embodiment thereof, it will be understood by those skilled in the art that various changes in form and details may be made therein without departing from the spirit and scope of the invention.

What is claimed is:

1. A shift multiplier comprising:
    a multiplicand register,
    a multiplier register,
    means for recoding a multiplier of $n$ bits, $r$ new bits at a time,
    means for generating multiples of the multiplicand $p$ bits at a time, said multiples corresponding to the output of said recoders,
    adder array means including at least $n/r$ boxes within the array, each box comprising a $p$ bit parallel adder containing $p$ separate full adder stages,
    selection means for serially gating $p$ bits of said multiplicand multiple into the adder array under control of the recoded version of said multiplier,
    output means associated with said adder for gating $p$ bits at a time from the lower order end of said adder array into a partial product register,
    means for serially gating successive $p$ bit groups of the multiplicand to the multiple generation means,
    means for gating successive $p$ bit groups of said multiplicand multiple into the adder array,
    system control means to continue gating $p$ bits of said multiplicand multiple to the adder array until all of the multiplicand in multiple form has been entered into said adder array,
    means responsive to said control means to transfer the current contents of the adder array in parallel to an assimilator once said multiplicand has been entered into the array in its entirety, and
    means to connect the output of said assimilator to an output register, the contents of which together with said partial product register form the complete product of the multiplication.

2. A shift multiplier as set forth in claim 1 wherein said control means includes:
    means for shifting $p$ bits from the low order end of said adder array, shifting new $p$ bits of said multiplicand multiples into said adder array for shifting the output of one adder box into the adjacent lower order box and for gating new $p$ bits of said multiplicand into said multiple generation means, said aforementioned means being operable to perform their functions substantially concurrently wherein said functions comprise a cycle of the system operation during the serial portion thereof.

3. A shift multiplier as set forth in claim 2 wherein said multiple generation means operates concurrently with said adder array to generate the multiples of the next $p$ bits of the multiplicand while the just generated multiples are being processed in the adder array.

4. A shift multiplier as set forth in claim 2 wherein said multiplicand is broken up into at least two segments, each having a plurality of $p$ bit bytes,
    separate multiple generating means for each segment whereby multiples of each segment of said multiplicand are generated simultaneously,
    a separate adder array, and
    selection means for each segment for receiving said generated multiples of each said segment from said multiple generating means under control of the recoded multiplier.

5. A shift multiplier as set forth in claim 4 wherein the recoding means requires both positive and negative multiples of said multiplicands, and
    said multiple generating means includes means for supplying said negative multiples.

6. A shift multiplier as set forth in claim 5 wherein means are provided for gating a "1" into the low order bit position of each adder box into which a negative multiple is introduced during the first time sequence of operation wherein the negative multiples provided by the multiple generator comprise a 1's complement of the positive multiples.

7. A shift multiplier as set forth in claim 6 including: a subtractor inserted between the high order end of the assimilator and the output register, and means to effectively insert binary 1's in the bit positions of the final product where the sign of the multiplicand and the multiple required by the output of the decoder are opposite.

8. A shift multiplier as set forth in claim 4 including: means for combining the contents of the adder arrays subsequent to the entry of the highest order $p$ bits of the multiples of each segment of the multiplicand in said arrays prior to transferring the outputs of said arrays to the assimilator.

9. A shift multiplier as set forth in claim 8 wherein the multiplicand is operated on by the multiple generators $p$ bits at a time, where $p$ is an integer greater than 1 and wherein there are $p$ full adder stages comprising a $p$ bit parallel adder within each box of the adder array, means connecting the carry outputs from lower order stages within a box to the next high order stage, means for storing the carry from the highest order stage within the box, and means for re-entering the carry into the lowest order stage of the box during the next subsequent cycle of operation of said adder.

10. A shift multiplier for forming the product of a multiplier and multiplicand, means for forming the partial products of successive bytes of the multiplier and $p$ bit bytes of the multiplicand, comprising means for forming multiples of said bytes of the multiplicand under control of recoded bytes of said multiplier, means for serially gating the partial products into and for serially adding the partial products in a serial adder array until all of the partial products are in the array, means for accumulating information gated out of the low order end of said serial adder array until all of said partial products have been gated into said adder array, and means for transferring all pseudo sums and carries remaining in the serial adder array in parallel to an assimilator upon the completion of said entry of partial products into said adder array.

11. A shift multiplier as set forth in claim 10 wherein said multiplicand is divided into at least two multi-byte $p$ bit segments, means for forming the partial products of bytes of the multiplier and corresponding order $p$ bit bytes of the multiplicand substantially concurrently, means for serially gating the partial products formed for each segment of the multiplicand into at least two separate adder arrays, each adder array comprising as many $p$-bit parallel adders as there are bytes in said multiplier, means responsive to the complete serial entry of all of the partial products for each segment into the adder arrays for combining the subtotals of the same order currently stored in each adder array into a single pseudo sum and carry output, and means for transferring said single pseudo sum and carry output into a fully parallel assimilator.

References Cited

UNITED STATES PATENTS 3,300,626   1/1967   Te-An Ling _____ 235—156

MALCOLM A. MORRISON, *Primary Examiner.*

V. SIBER, *Assistant Examiner.*